United States Patent [19]

Southard

[11] 4,399,535

[45] Aug. 16, 1983

[54] DIGITAL TONE GENERATOR

[75] Inventor: Gary D. Southard, Coral Springs, Fla.

[73] Assignee: Siemens Corporation, Iselin, N.J.

[21] Appl. No.: 275,146

[22] Filed: Jun. 18, 1981

[51] Int. Cl.³ .............................................. H04J 3/12
[52] U.S. Cl. ............................. 370/110.2; 179/84 VF
[58] Field of Search ............... 370/110.2; 179/84 VF, 179/18 J, 99 M

[56] References Cited

U.S. PATENT DOCUMENTS

| | | | |
|---|---|---|---|
| 3,870,826 | 3/1975 | Carbrey et al. | 370/110.2 |
| 3,985,965 | 10/1976 | Field et al. | 370/110.2 |
| 4,110,562 | 8/1978 | Moed | 370/110.2 |
| 4,205,203 | 5/1980 | Mehta et al. | 370/110.2 |

FOREIGN PATENT DOCUMENTS 1325193 1/1973 United Kingdom .

Primary Examiner—Douglas W. Olms
Attorney, Agent, or Firm—Karl F. Milde, Jr.

[57] ABSTRACT

A digital tone generator for use with a digital telecommunication system for simultaneous generation of continuous and cyclically repeated discontinuous tone signals each composed of at least one frequency component incorporates sequencing control means, amplitude control means, amplitude value generating means and output means. The sequencing control means generates consecutively incremented reference address signals directing the course of an operating cycle, thus allowing for some amount of parallel processing of the subunits. The amplitude control means produce amplitude control signals which determine varying mean amplitude values of a discontinuous digital tone signal at the commencement of the rising and trailing ends of each pulse. Any stepwise adjustment of the mean amplitude value takes place coincidentally with an instantaneous amplitude of zero value and in accordance with a predetermined attenuation curve. The amplitude value generating means connected to receive the reference address signals and the amplitude control signals furnish a digital encoded signal representing an instantaneous amplitude value of a respective digital signal to output means for transmitting the same onto a time multiplexed transmission line.

21 Claims, 19 Drawing Figures

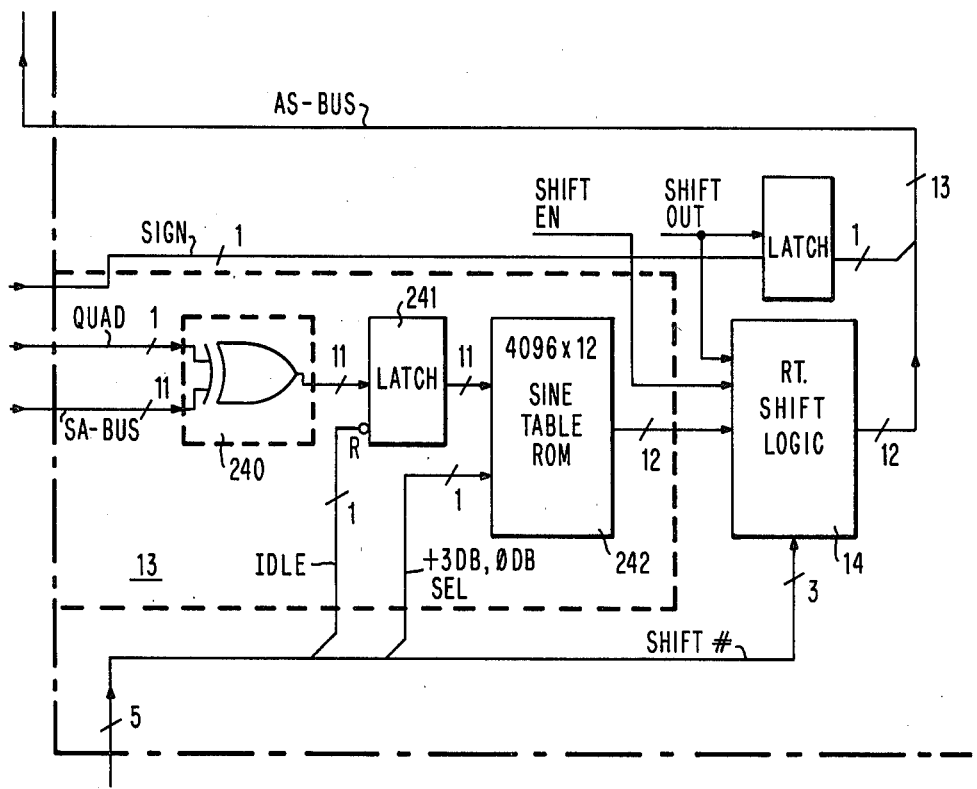
FIG. 2C
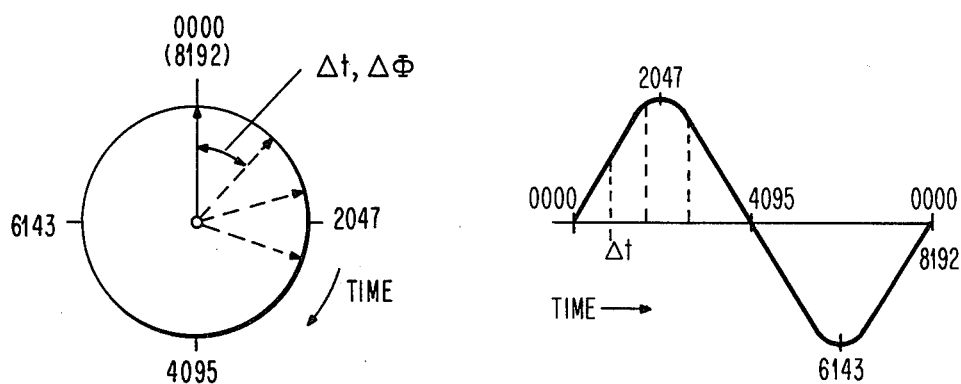
FIG. 4
FIG. 5

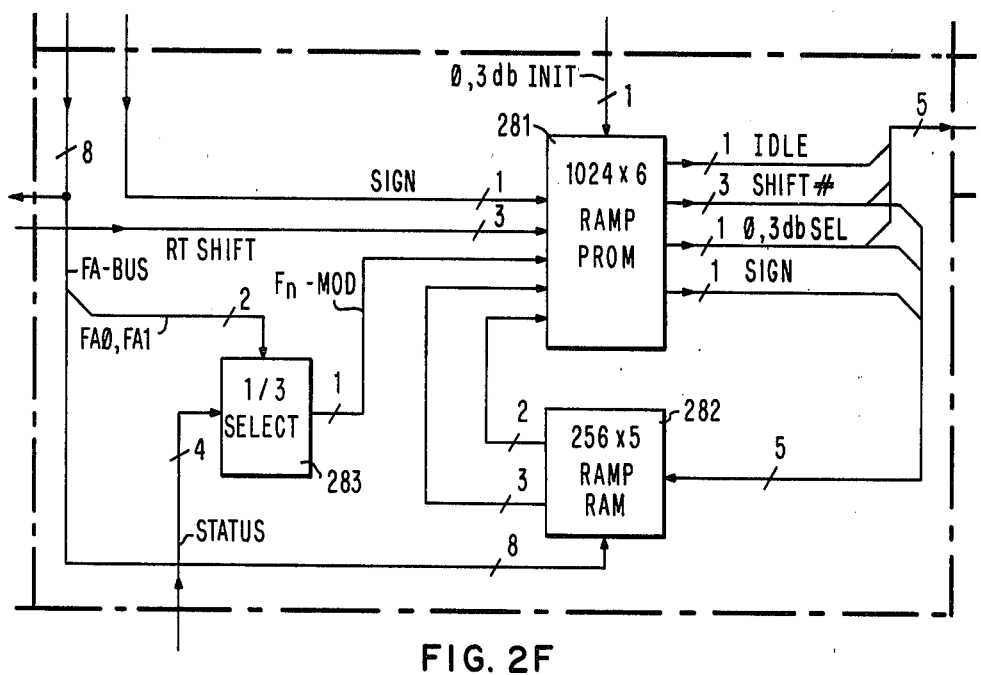
FIG. 2F
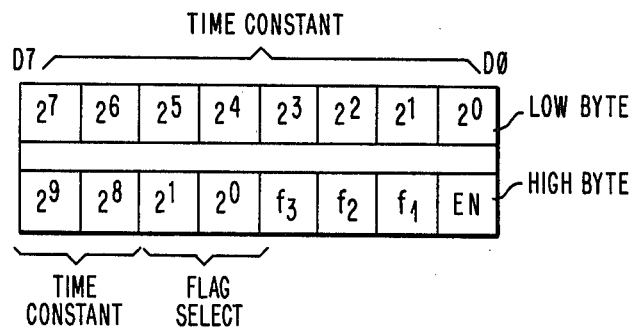
FIG. 6
FIG. 7

DIGITAL TONE GENERATOR

BACKGROUND OF THE INVENTION

1. Field of the Invention

The present invention relates to a digital tone generator and especially to such a generator for use in digital telecommunication systems.

2. Description of the Prior Art

A basic form of a digital tone generator is illustrated and described in British Patent No. 1,325,193. Such a tone generator is employed instead of a conventional analog tone generator for various tone signals which are required in the operation of digital telecommunication systems. There is a need to generate various call processing tones, such as a busy tone, answer-back tone, etc., various dial tones and various test tones internally used by the telecommunication system for testing the availability and performance of redundant sub-units. Such tone generators may, therefore, furnish continuous tones or produce pulses of a discontinuous tone signal. Each tone may be composed of one or more frequency components according to national and international standards. Recent advances in the field of semiconductor technology offer possibilities to design digital tone generators requiring less space, being less costly and more flexible in use than their analog counter parts, so that they may be utilized to advantage in any application where analog tone generators have previously been employed.

The structure of a digital tone generator composed of components operating on a digital basis fits properly into a digital telecommunication system comprising a plurality of speech channels transmitting binary encoded information simultaneously in time and space multiplex. Furthermore, a digital tone generator can easily be adjusted to different applications to generate different sets of tones.

In addition, there are new areas of application for digital tone generators such as in connection with electronic music apparatus.

In many instances, it is desirable that a digitally generated tone does not begin or stop at its full loudness. When used in a telephone exchange system, "hard switched" tones would generate key clicks at the beginning and end of pulses of discontinuous tone signals. This should be avoided for the comfort of subscribers. Even more important, however, is a "soft switching" of pulses for obtaining a high reliability of digital telecommunication systems. Such systems include devices, such as filters, which react violently to sudden energy changes, tend to oscillate subsequently and need long recovery times until valid signal conditions are reached.

In digital tone generators which heretofore have been employed, the output level of the tone generator is adjustable so that a nominal loudness level can be achieved. However, these systems do not incorporate a separate control for individually adjusting the loudness level at the beginning and end of a tone pulse.

While the apparatus disclosed in the aforementioned British Pat. No. 1,325,193 is an attempt to reach a desirable solution to the problem, the apparatus described therein has some disadvantages which are desirable to avoid.

SUMMARY OF THE INVENTION

It is a principal object of the present invention to provide a digital tone generator which generates simultaneously a variety of tones, one the one hand, and meets real time conditions inherent to a surrounding digital system, on the other hand.

Another object of the present invention is to provide such a digital tone generator being sufficiently flexible to be capable of setting frequencies and levels for the tones to be generated to suit different requirements for these tones in telecommunication systems to be utilized in a number of national and international market areas.

A further object of the present invention is to provide such a digital tone generator for generating tones composed of at least one frequency component having a frequency substantially in the band of conventional telephone systems with a small frequency tolerance meeting the requirements of national and international standard tone plans for telecommunication systems.

A further object of the present invention is to provide a digital tone generator offering the setting of frequencies individually in steps of approximately 1 Hz and the setting of amplitudes in steps of approximately 1 db.

Still a further object of the present invention is to provide a digital tone generator as above which permits generation of discontinuous tone signals based upon a timing program or pattern causing changes in amplitude, frequency, or frequency combinations as a function of time and which are repeated cyclically; such timing patterns may include various time constants which should cover a range of up to several seconds in steps of some milliseconds.

These and other objects which will become apparent from the description which follows are achieved by a digital tone generator which is adapted to be connected to a digital telecommunication system and which simultaneously generates during a tone generator operating cycle digital encoded instantaneous amplitude values of a variety of continuous and of cyclically repeated discontinuous tone signals. Each tone signal is composed of at least one frequency component and is assigned to a separate tone channel of a tone highway representing a time-division multiplexed serial transmission line.

The digital tone generator according to the present invention is provided with sequencing control means for generating a consecutively incremented and cyclically repeated reference address signal directing the course of the operating cycle. There are provided amplitude control means for generating amplitude control signals. These signals determine varying mean amplitude values of discontinuous digital tone signals such that this mean amplitude value is stepwise adjusted coinciding with the instantaneous amplitude of a zero value. The adjustment is performed in accordance with a predetermined attenuation curve and takes place at the commencement of the rising and trailing ends of a pulse of the respective discontinuous digital tone signal. The amplitude control means include inputs connected to receive the reference address signal, storage means for storing steady and variable amplitude control information, processing means for producing the amplitude control signals, and at least one output. Amplitude value generating means are connected to receive the reference address signal and the amplitude control signals for generating a digital encoded signal representing one of the instantaneous amplitude values. Furthermore, there is provided an output means connected to receive the digital encoded signals for transmitting the same onto the tone highway in synchronization with the cyclical occurrence of the assigned tone channel.

This structure allows for setting of tones varying in amplitude, frequency and pulse pattern in a wide range and for generating a multiplicity of tones in accordance with sampling schemes standard for digital pulse code modulated telecommunication systems. The structure of the digital tone generator of the present invention is very flexible to meet corresponding time frame requirements of digital telecommunication systems, since the operations of various sub-units can be "pipe lined" to some extent. This is achieved by means of the synchronizing function of the reference address signal which coordinates the operations of the amplitude generating means, the means for generating amplitude control signals, and, indirectly, the output means which receives a digital encoded signal in proper timing to meet the corresponding time slot in the time frame of the tone highway. Such a time slot represents a respective tone channel assigned to a corresponding digital encoded signal.

In addition, this pipe lining allows for monitoring the progress of a discontinuous tone such that it can be determined in advance when the instantaneous amplitude value of a discontinuous tone or its frequency component will go through zero. Thus, an adjusting of the variable mean amplitude value, that is the temporary amplitude level of each digital tone and even a frequency component can be performed individually. This allows for ramping pulse edges in accordance with a predetermined attenuation slope by means of coherent amplitude modulation, since any adjustment of the amplitude value is synchronized with the zero crossings of the corresponding instantaneous amplitude values. Evidently, this scheme minimizes transient distortion thereby eliminating "clicks" in the progress of a discontinuous tone which is desirable for a listening telephone customer and, even more important, for the proper operation of all devices such as filters being sensitive to sudden tone energy changes.

BRIEF DESCRIPTION OF THE DRAWINGS

FIG. 2C shows a detailed block diagram of a sine generator and a right shift logic for establishing different levels of tones;

FIG. 2F shows a block diagram of a gain control unit controlling the speech level of such discontinuous tones by means of such status information especially important for performing ramp up/down modulation;

FIGS. 4 and 5 illustrate the addressing scheme of the sine wave generator by means of a circular diagram and a related cartesian diagram of a full period of a sine wave form;

FIGS. 6 and 7 represent the layout of an external memory of the microprocessor system of FIG. 2E, the cadence PROM with respect to the composition of an entry specifying a cadence step and a dial pulse step, respectively;

DESCRIPTION OF THE PREFERRED EMBODIMENT

Figure 1:
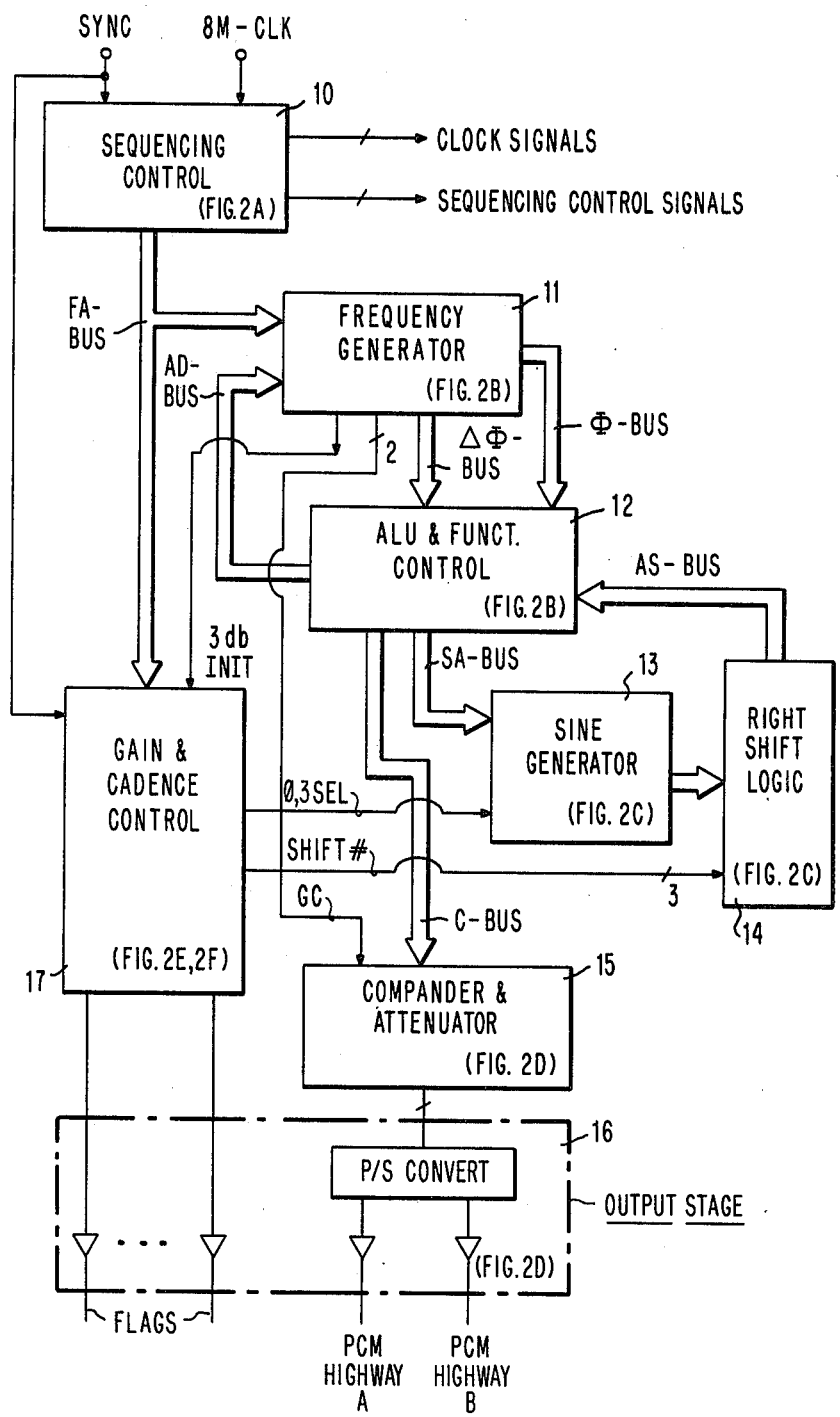
FIG. 1 shows a block diagram representing the structure of a digital tone generator.

General (FIG. 1)

The tone generator is basically a digital frequency synthesizer with the capability for generating simultaneously up to 64 different call processing tones. The tones are generated in the form of pulse code modulated (PCM) digital signals to be used for signalling and call progress indications. Each tone is permanently assigned to a channel, thus 64 different tone channels are provided. Each tone channel consists of either a continuous "tone" comprising one to three frequency components, or a tone cadence of one to three frequency components. The term "cadence" is used herein to mean a timing program or pattern which causes changes in amplitude, frequency or frequency combination as a function of time. All the cadences referred to are repeated cyclically. The tone channels are arranged in two tone channel highways, wherein the term "highway" is to be understood as a time-division multiplexed serial data node having 32 different time slots. Each time slot consists of 8 data bits, that is a PCM sample of a pulse frame of 125 $\mu$sec.

The design of the digital tone generator is such that to each tone channel individually a tone can be assigned which is specified by the following parameters:

(1) any frequency to be selected from the range of 0 to substantially 4 KHz in 1 Hz increments;

(2) a number of frequency components from one to three;

(3) any frequency amplitude from $-44$ dbm to $+3$ dbm in 1 db steps; and (4) the tone may be continuous or interrupted, that is a cadence can be defined having an interruption period selectable from the range of 4 msec to 8 sec in 4 msec steps.

A basic understanding of the multi-channel time division tone generator may be had by a discussion of its fundamental structure which is shown in FIG. 1 representing a basic block diagram. The digital tone generator is provided with a sequencing control unit 10 which synchronizes the operation of the digital tone generator with an external time frame inherent to the surrounding PCM system by providing clocks, enable signals and various control signals to the remainder of the apparatus. The sequencing control unit 10 receives a super frame synchronization signal SYNC of 250 Hz for aligning time slot $\emptyset$ of the tone generator to time slot $\emptyset$ of the PCM system. A master clock signal referenced as 8M-CLK is passed to the sequencing control unit 10; this clock signal in fact has a pulse frequency of 8.192 MHz. The reason for this main clock frequency will become more apparent later, for the time being it may be noticed that even the chosen "pipe line" structure of the digital tone generator still requires a multiplicity of real time steps performed in a serial manner to achieve the simultaneous mode of operation.

This main clock is used to generate internal clock pulse trains controlling the operation of the digital tone generator. Internal clock signals are schematically indicated in FIG. 1 as one group of output signals. A second group of output signals of the sequencing control unit 10 comprises sequencing control signals determined to control the sequence of operations of the digital tone generator, above all with respect to interactions of different units via data buses.

It will become more apparent later from a detailed description of the sequencing control unit 10 that its further characteristic is to furnish consecutive frequency addresses specifying a tone or a frequency component of a tone. Each frequency address is composed of a plurality of bits and is supplied via a frequency address bus FA-BUS in parallel to two further units of the tone generator.

One of these units is a frequency generator 11. The characteristic of this unit is to initiate generating of required frequencies. To this reason, the frequency generator 11 mainly is composed of two devices, a programmable read only memory, the so-called $\Delta\phi$ PROM and a random access memory, the $\phi$ RAM. For each different tone frequency a constant $\Delta\phi$ is assigned and stored in the $\Delta\phi$ PROM. Also in the $\phi$ RAM a memory location is assigned to each frequency for intermediately storing an accumulated value $\phi$ comprising an integral multiple of that constant $\Delta\phi$. An accumulated $\phi$ value corresponds to a specific amplitude value of a sine wave, as will become more apparent later.

An arithmetic and function control unit 12 performs summing operations required by the frequency generator 11 based upon $\Delta\phi$ and $\phi$ values which are supplied to the arithmetic and functional unit 12 via a second bus the $\Delta\phi$-BUS and a third bus, the $\phi$-BUS. The result, an accumulated current $\phi$-value is sent back to the frequency generator 11 via a further bus, the AD-BUS and is stored in the $\phi$-RAM.

Another task of the arithmetic and functional unit 12 is summing or superposing of two or three frequency components of a tone, if necessary. Such values are supplied to the arithmetic unit 12 along a further bus, the attenuated data bus AS-BUS.

The results of the summing operations are given out along two further buses. One bus is referred to as sine address bus SA-BUS indicating by the label that the result of the summing operation with respect to these frequency values is sent back to the frequency generator 11 and passed on as well to the other bus labelled C-BUS which transmits summed sine amplitude values to further sub-units of the digital generator.

One of these units connected to the arithmetic and functional unit 12 is a sine generator 13. The sine generator in fact includes a sine table of amplitude codes stored in memory locations of a storage device which is addressed by means of the accumulated $\phi$ values. A linear amplitude signal established by the sine generator 13 is transmitted to a further device of the digital generator, a right shift logic unit 14. This unit mainly is composed of fast operating shift registers. By means of these shift registers, the amplitude signal received from the sine generator can be attenuated to 6 db steps, since a 6 db attenuation of a binary encoded signal can be implemented by performing a right shift operation on the bit pattern.

By a series of right shifts any multiple of a 6 db attenuation may be achieved. The design of the digital tone generator is such that up to 7 shifts are possible such that a +3 dbm value obtained from the sine generator 13 can be attenuated down to −39 dbm.

The attenuated amplitude code is transferred by means of the AS-BUS to the arithmetic and functional unit 12. The received data will there be summed with either another attenuated amplitude code of a frequency component for frequency summing or with a zero value if a tone consists of just one frequency component.

The results are transferred across the C-BUS from the arithmetic and functional unit 12 to a further unit of the digital tone generator, a compander and attenuator 15. This device takes in the summed attenuated amplitude signal comprising linear encoded PCM data of 12 bits and converts it to a 7-bit companded code in a conventional manner which has been used with PCM telecommunication systems for companding a linear PCM code into a companded code according to A- or $\mu$-law, as well. In addition to that, the 7-bit companded code can be further attenuated in a range from $\emptyset$ to 2 db of the relative amplitude in 1 db steps, if necessary for fine adjustments, and be passed to an output stage 16.

Still a further unit of the digital tone generator is represented in FIG. 1, a gain and cadence control unit 17. It will be described later in detail that the gain control 17, as indicated in the drawing, receives the frequency address from the sequencing control unit 10 and controls based upon information stored in a small programmable read only memory, of attenuating of an amplitude signal of a specific tone by supervising the number of shifts in the attenuator 14. In the gain and cadence control unit 17 also a specific cadence pattern, assigned to a tone being processed, is selected and based upon control operations of a separate microprocessor, the turn-on and turn-off times of interrupted tones are controlled. The value of the interruption period can be stored in a cadence memory. Any value in the range of 4 msec to 8 sec can be selected and programmed in 4 msec intervals.

In addition to that, the gain and cadence control unit 17 also is provided for generating different software flags which are intended for interfacing a main processor status register or interrupt inputs. Such outputs, as schematically indicated, inter-connect the gain and cadence control unit with facilities of the main PCM system, not shown. These outputs designated as flag outputs supply dial pulse flags and cadence windows as well for the main system software indicating that a respective pulse or cadence pattern is to be turned on or off.

The described structure of the digital tone generator makes evident that its main characteristic is to provide a multiplicity of different tones or cadence patterns simultaneously by means of conventional devices which are arranged in a pipe line structure for achieving the output data within the given time frame. This structure will be described in more detail in the following.

Figure 2A:
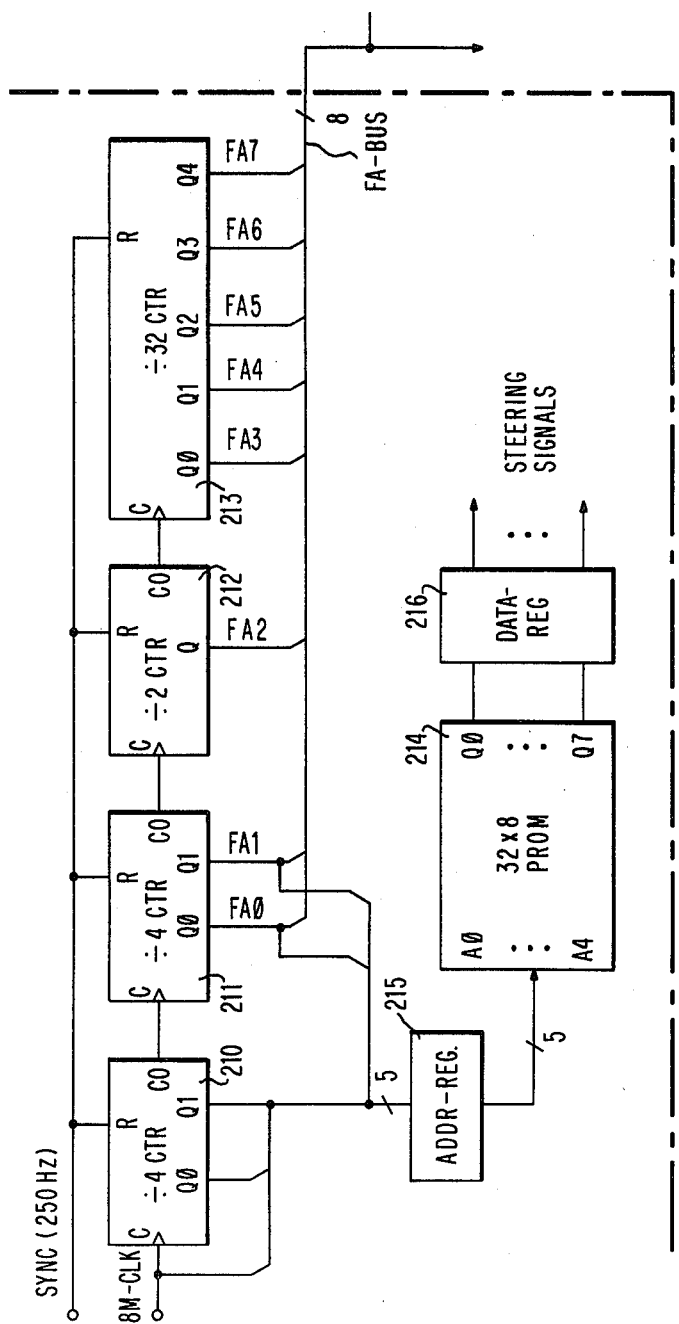
FIG. 2A shows a detailed block diagram of a sequencing unit for generating reference addresses associated with each digital tone.
Figure 3:
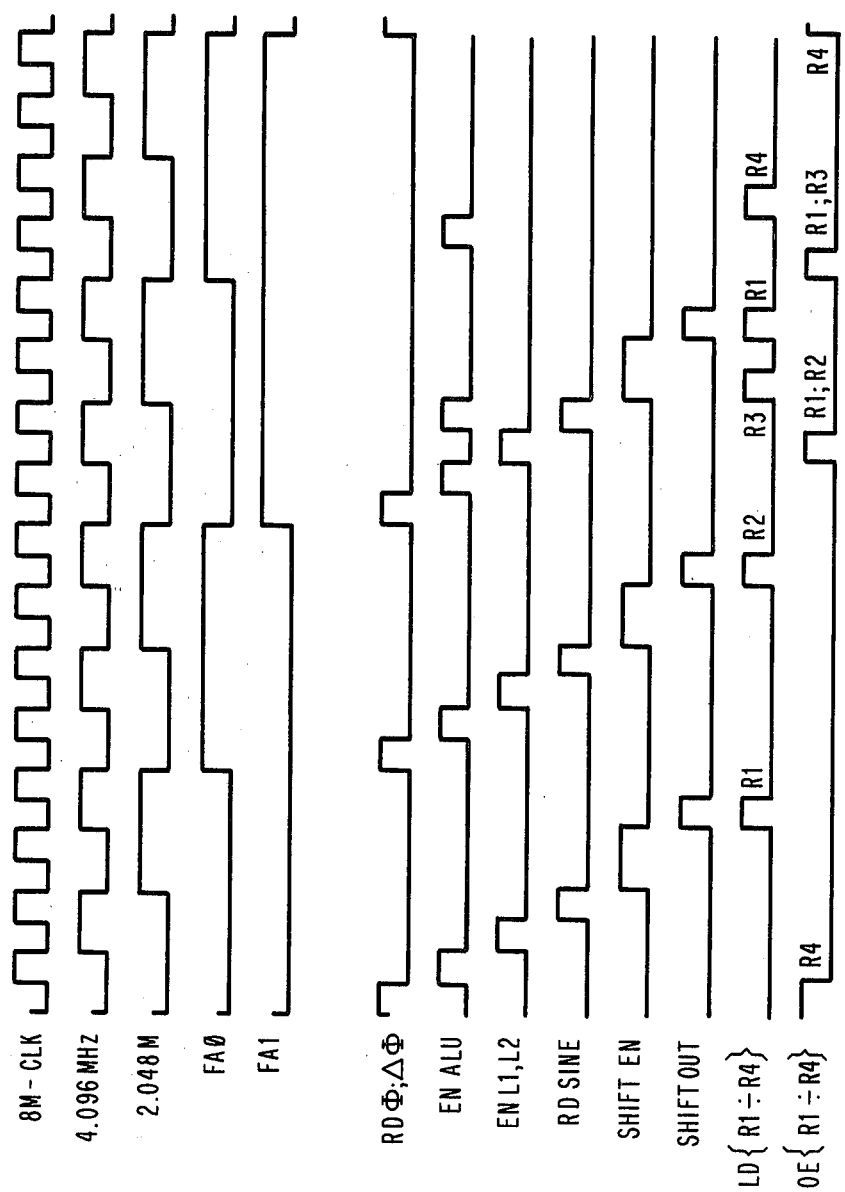
FIG. 3 shows a timing diagram of various clock signals and derived steering signals generated by the sequencing unit represented in FIG. 2A.

The Sequencing Control Unit (FIGS. 2A, 3)

For a better understanding of the first unit to be described in more detail in the following, it may be best to recall briefly some fundamentals of pulse code modulation.

Existing PCM telecommunication systems usually have a sampling rate of 8 KHz corresponding to the sampling theorem requiring that the sampling frequency should be at least twice as high as the maximum signal frequency. This sampling rate matches with the inverse characteristic, the sampling interval of 125 $\mu$sec. It has been explained that each of the tone highways A, B comprises 32 tone channels A$\emptyset$ through A31 and B$\emptyset$ through B31, respectively. Each of the PCM words corresponding to a sample, consists of eight digits. A frame of 32 PCM words has to be transmitted in a sampling interval, wherein each PCM word takes about 4 $\mu$sec. The corresponding frequency for transmitting a PCM word in a time slot of 4 $\mu$sec therefore is 256 KHz and the bit-frequency, because of eight bits within each time slot, is 2.048 MHz. Additionally, it may be noted that in a conventional PCM telecommunication system 32 frames comprise a so-called "super frame", this structure is set up for synchronizing purposes wherein each super frame contains a special synchronization signal SYNC having a frequency of 250 Hz accordingly.

The digital tone generator has to be compatible with these fundamental system requirements and it can be obtained from a simple calculation that in the assumed case of 64 tones, or tone patterns, to be furnished in time division, each tone has to be generated within a period of about 2 $\mu$sec corresponding to a frequency of 64×8 KHz which equals 512 KHz. Since each tone can be composed of up to three frequency components as specified by the two least significant bits FA$\emptyset$, FA1 of the frequency address, each frequency component has to be selected and processed within a period of about 0.5 $\mu$sec; the corresponding frequency is 2.048 MHz. Any integral multiple of this frequency, therefore, will be an appropriate clock frequency for the digital tone generator dependent upon the amount of overlapping to be achieved in a pipeline structure.

Figure 2:
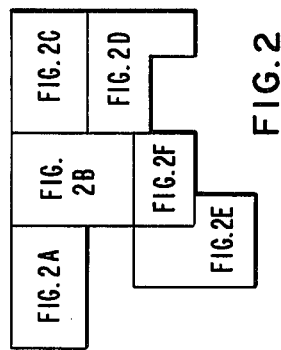
FIG. 2 is a legend representing the relationship of FIGS. 2A through 2F each rendering a detailed block diagram of sub-units of the digital tone generator.

A structure of the sequencing control unit is shown in FIG. 2 in form of a block diagram. Four binary counters 210, 211, 212 and 213 are arranged in a cascade by connecting a carry output CO of the first counter 210 to a clock input of the second counter and so forth. Each of the first and the second counters 210 and 211, represents a divide-by-4 counter, the third counter performs a divide-by-2 operation and the fourth counter is designed as a divide-by-32 counter. All counters receive in common at reset inputs R the synchronization signal SYNC which is the super frame synchronization signal mentioned hereinbefore. The second input signal passed to the clock input C of the first counter 210 by the surrounding PCM system is referenced as 8M-CLK thereby designating it as clock signal of 8.192 MHz. Each output of the second, third and fourth counters is connected to a respective line of the frequency address bus FA-BUS. As indicated in the drawing, the outputs of the fourth counter supply the five most significant bits FA7 through FA3 of this address which bits determine a specific time slot. The output of the third counter 212 supplies another bit FA2 of the frequency address which selects one of the tone highways A, B. Both outputs of the second counter 211 furnish the remaining least significant bits FA1 and FA$\emptyset$ of a frequency address which bits specify a frequency component.

Recent advances in the art of integrated circuits render a possibility for implementing a tone generator sequencing control by means of a storage unit designed as read only memory (ROM) or programmable read only memory (PROM) wherein timing pulses furnished at the outputs of the first and second counters 210 and 211, respectively, and including the main clock pulse are used for generating addresses. This approach saves numerous digital components which would be necessary for implementing the control unit completely in hardware. If the two least significant bits of a frequency address are used as most significant address bits, such a sequencing PROM or ROM will have a cycle period of substantially 2 $\mu$sec for consecutively selecting all the memory locations. Such cycle period corresponds to a frequency of 0.512 MHz which is the frequency for transmitting time slots.

The appropriate address volume of the sequencing PROM is dependent upon the resolution which is necessary for controlling the timing of sequences in the tone generator and the amount of steering which has to be implemented. In the implementation of the sequencing control unit, as presented in FIG. 2A, the sequencing PROM 214 comprises 32 memory locations as defined by a 5 bit address; this address volume is not a fixed value, but is subject to a necessary resolution for an appropriate timing of sequences. The second degree of freedom is expressed by the length of a storage word accessable by a specific address.

Since programmable control units in themselves are now conventional and since the concept of the present application is described hereinbefore a complete detailed description of the sequencing PROM 214 is deemed not to be necessary. Rather than that, it is preferred to emphasize on a more generalized explanation by the way of an example for the purpose of easier comprehension by simplification.

The steering principles, thereby, will become apparent to those skilled in the art and any adjustments based upon access times and propagation times of components to be used in an actual implementation can be made appropriately.

The main device of the tone generation sequence control, as shown in FIG. 2A, is a 32×8 bit sequencing PROM 214 having five address inputs A$\emptyset$ through A4 and eight data outputs Q$\emptyset$ through Q7. As schematically indicated there are arranged two registers 215 and 216 connected to the sequencing PROM 214. The first register forms an address register 215, whereas the second register represents a data output register 216. Each of the inputs of the address register 215 is connected to a respective one of the outputs of the first and second counters 210 and 211. The least significant input of the address register 215 receives the main clock pulses 8M-CLK.

The bit patterns applied to the inputs of the address register 215 determine consecutive addresses for the sequencing PROM 214 which has 32 memory locations each consisting of an 8-bit word. It follows from the structure of the address bit patterns composed of derived clock pulse signals that the memory locations of the sequencing PROM 214 are repeatedly cyclically addressed. Each data word is read out in parallel to the output data register 216. At each of the Q-outputs of the sequencing PROM 214 a cyclical pulse train is generated which is dependent upon the contents of corresponding bit locations in subsequent memory words. In the given example of the sequencing PROM 214 eight output pulse trains can be generated in parallel. Evidently a variety of changes with respect to the address volume and the broadness of a memory location can be made in accordance with different implementations of a sequencing control unit in accordance with an overall design of the digital tone generator.

FIG. 3 shows a set of timing diagrams describing a possible layout of the sequencing PROM 214. The first five lines of FIG. 3 show pulse trains which represent at a corresponding moment of time one of the address bit patterns passed to the address register 215 for selecting a memory location in the sequencing PROM 214. The layout of FIG. 3 is such that a complete read cycle of the sequencing PROM is covered.

The second group of wave forms, shown in FIG. 3, represents examples for respective steering signals for controlling the sequence of operations of different units of the digital tone generator. Each of the timing diagrams of this group is generated at a respective one of the outputs Q$\emptyset$ through Q7 of the sequencing PROM 214 and the connected data register 216, respectively. Obviously, the time relationship of these pulse trains is of importance, but since the detailed design of the frequency generator 11, the arithmetic and function control unit 12, the sine generator 13 and the right shift logic 14 have to be described yet in detail, further explanation of the purpose of those steering signals will be given later in conjunction with the description of the operation of the aforementioned units of the digital tone generator.

Figure 2B:
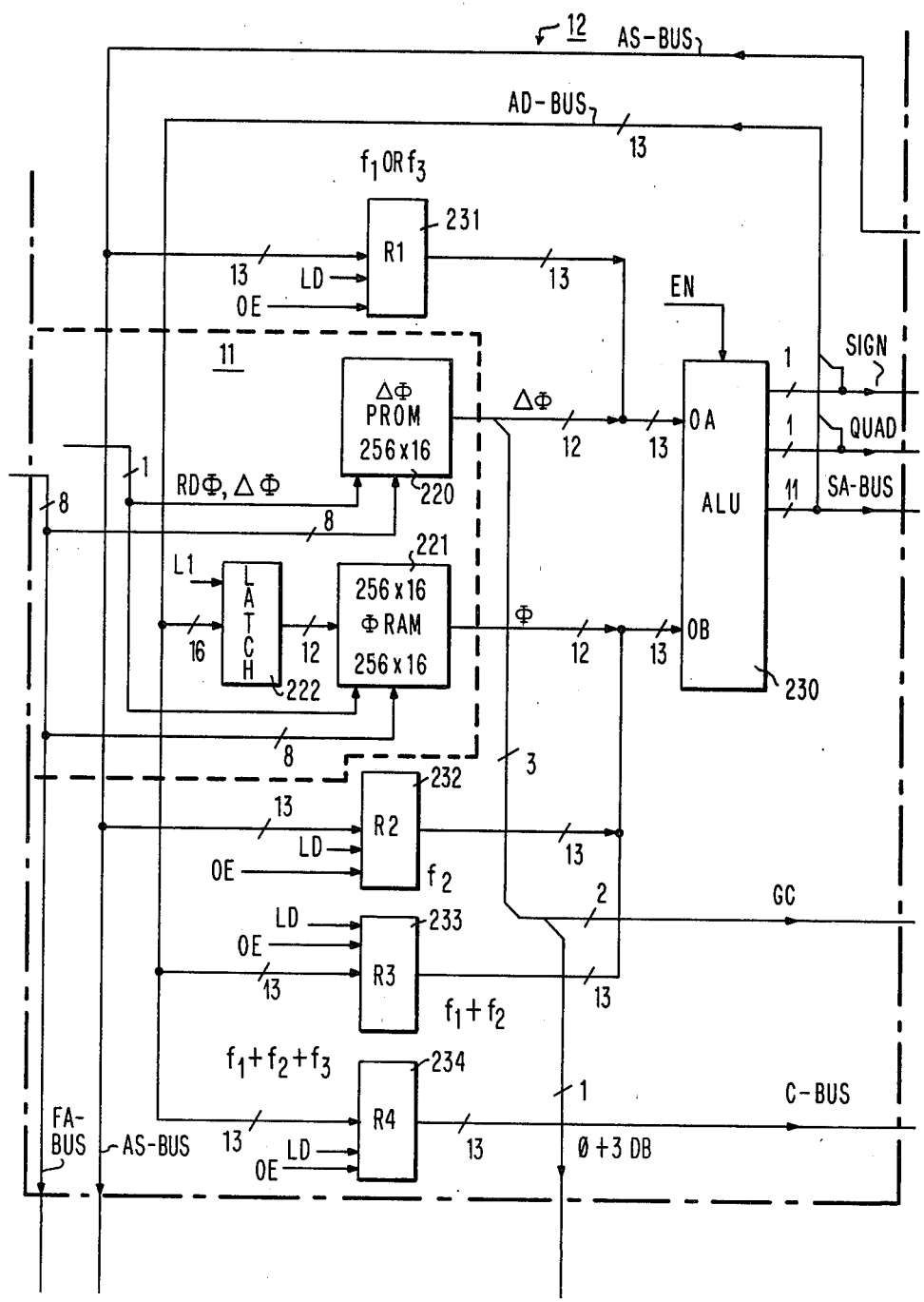
FIG. 2B shows a detailed block diagram of a frequency generator for generating instantaneous phase values of tones for addressing a sine generator and of an arithmetic and functional control unit.

The Frequency Generator (FIG. 2B)

As described with reference to FIG. 1 the frequency generator 11 provides consecutive phase addresses, each designed for a different tone and/or a frequency component of a tone. The addresses serve for selecting an entry of a sine table in the sine generator 13 where an amplitude value is stored. The frequency generator mainly is composed of three devices, a phase PROM 220, a phase RAM 221 and a phase RAM latch 222. The frequency generator is connected to the frequency address bus FA-BUS providing current addresses for both the phase PROM 220 and the phase RAM 221. Any current 8-bit address FA$\emptyset$ ... FA7 designates a different one of 256 memory locations in each of these storage units. The phase PROM 220 comprises two conventional 256×8 PROM chips forming together the single 256×16 bit PROM 220, as schematically shown in FIG. 2B.

A better overview of the composition and the structure of the phase PROM 220 may be had from a first table (TABLE 1) representing the layout of the PROM. It is divided into 64 blocks in correspondence with 64 tone channels. Each block consists of four data words having a high and a low byte. Each block contains phase information for up to three frequency components $f_1$ through $f_3$ and an attenuation code determined by two bits GC$\emptyset$, GC1. These bits specify a fine adjustment of a tone which adjustment is performed between the companding operation and passing of a tone pattern onto the corresponding highway A or B. The consecutive blocks are alternately assigned to one of the tone highways A or B, and therein to one of the time slots $\emptyset$ through 31, each corresponding to one tone channel.

In the following, the coding requirements of the phase PROM 220 will be described with respect to its layout shown in Table 1. To each frequency component there is assigned a phase constant composed of twelve bits in positions TD1 through TDC, wherein phase bit TD1 is the least significant bit. Any frequency can be designated by a corresponding phase constant within the range of $\emptyset$ to 3,999 Hz in one Hz increments, since a 12-bit data word covers a volume of up to 4,096 modifications. Each phase constant is a characteristic for a given frequency and can be calculated as follows: the value of a given frequency is multiplied by 1.024 and a constant of 0.5 is added. This decimal result is converted into binary form wherein the phase bit TD1 is the least significant bit. For a frequency of 941 Hz, for example, the phase constant expressed in a decimal number is 964. This decimal number corresponds to a bit battern $\emptyset\emptyset$1 1 1 1 $\emptyset\emptyset\emptyset$1 $\emptyset\emptyset$ which can be easily verified. The right bit is the least significant phase bit TD1 and the left most bit position represents phase bit TDC.

Detailed explanation of the objects and the characteristics of the phase constants will be given later in conjunction with the description of the sine amplitude value generation.

TABLE 1

| PROM ADDR | CHAN | TONE | PROM CHIP HIGH BYTE | PROM CHIP LOW BYTE |
|---|---|---|---|---|
| 0 | A0 | f1 | I3 \|GC1 \|GC0 \|X \|TDC \|TDB \|TDA \|TD9 | TD8 \|TD7 \|TD6 \|TD5 \|TD4 \|TD3 \|TD2 \|TD1 |
| 1 | | f2 | I3　X　　X　X　TDC　TDB　TDA　TD9 | TD8　TD7　TD6　TD5　TD4　TD3　TD2　TD1 |
| 2 | | f3 | I3　X　　X　X　TDC　TDB　TDA　TD9 | TD8　TD7　TD6　TD5　TD4　TD3　TD2　TD1 |
| 3 | | not used | X　X　　X　X　X　X　X　X | X　X　X　X　X　X　X　X |
| 4 | B0 | f1 | GC1　　GC0 | |
| 5 | | f2 | for chan A0 | |
| 6 | | f3 | | |

TABLE 1-continued

| PROM ADDR | CHAN | TONE | PROM CHIP HIGH BYTE | PROM CHIP LOW BYTE |
|---|---|---|---|---|
| FC | B31 | f1 | GC1 GC0 | |
| FD | | f2 | for chan A1 | |
| FE | | f3 | | |
| FF | | not used | X X X X X X X X | X X X X X X X X |

As indicated, the attenuation code is determined by two bits which are referenced GC∅ and GC1. These bits are located in the data word of each channel which corresponds to a first frequency component of a tone. It may be noted that these codes are off-set down by one channel from their respective frequency composite. This means, as shown in Table 1, the attenuation code for the tone channel A∅ is stored into the first word of the next following four word block assigned to the tone channel B∅; the code for this tone channel is then stored in the first word of tone channel A1, etc. This layout results in that the attenuation code assigned to tone channel B31 is contained in the first word for the first channel A∅. This arrangement of the layout is consistent with the timing sequence of the tone generator and its pipeline structure which will become more apparent later.

The two bit code can designate up to four modifications which are used for specifying an attenuation operation in the range from ∅ to 2 db in 1 db steps.

The layout of the frequency PROM 410 in Table 1 shows that the most significant bit I3 of the high byte is used for another one-bit code. This I3 bit determines, which will be explained later in detail, which one of two different sine wave tables of the sine generator 13 shall be selected. It may be mentioned here that corresponding linear amplitude values are stored in the two different sine wave tables which values differ from each other by 3 db.

Referring now again to FIG. 2B, it is deemed to be apparent from the description of the layout of the phase PROM 220 that twelve outputs supply the phase constant information $\Delta\phi$ consisting of phase data bits TD1 through TDC. Two further outputs of the PROM supply the bits GC∅ and GC1 of the fine attenuation code GC. A further output line carries the 3 db initiate bit I3.

The phase constant of a frequency component designated by the phase data bits is an inherent characteristic for a frequency, as has been indicated. In the progress of selecting values from the sine wave tables of the sine generator 13, a current address is an integral multiple of that constant. For each subsequent cycle of the digital tone generator, therefore, the previous sine table address, the accumulated phase value $\Phi$ of a frequency component has to be increased by the value of the corresponding phase constant $\Delta\Phi$. For this reason, the current phase value $\Phi$ has to be intermediately stored for one cycle of the tone generator as a variable operand whenever a phase value $\Phi$ is updated.

The phase memory $\Phi$RAM 221 has the same capacity as the phase PROM 220 and its layout is designed accordingly. In contrary to the phase PROM 220, however, the phase RAM 221 does not store the fine attenuation code GC∅, GC1 and the 3 db initiate bit I3, either. But the thirteenth bit of a phase RAM word is used for a further most significant bit which is the D-bit of a double byte word, as determined by its position in the memory word. With reference to the layout of the sine wave tables of the sine generator 13, it will be described in detail that this D-bit and another bit, the SIGN-bit designate a code combination for specifying one of four quadrants of a sine wave function.

The frequency phase RAM 221 and the phase PROM 220 are commonly supplied with addresses by means of the frequency address bus FA-BUS, and are commonly activated for read operations by one of the sequencing control signals, a read enable signal referenced in FIG. 3 as RD$\Phi$, $\Delta\Phi$. The time of a write operation into the phase RAM 221 is of less importance, since data to be written into it are intermediately buffered in the frequency RAM latch 222.

As will become more apparent later, the variable phase data $\Phi$ and the phase constant data $\Delta\Phi$ corresponding to a specific tone or frequency component of a tone are simultaneously read out and passed to the arithmetic and functional unit 12 interpreting the same as two operands of a summing operation. The accumulated variable phase data are fed back across a further bus, the accumulated data bus AD-BUS and are stored in the frequency RAM latch 222. This latch is enabled to obtain this data word from the bus at this time by a further steering signal which is referenced in FIG. 3 by EN L1. The only time limitation, as far as the mode of operation of the phase RAM 221 is concerned, is that the accumulated data word has to be fed back and stored in the RAM 221 prior to an address change.

The Arithmetic and Functional Unit (FIG. 2B)

From the description of the frequency generator a main purpose of the arithmetic and functional unit 12 is evident. It has to perform the summing operation of the variable phase data $\Phi$ and the phase constant data $\Delta\Phi$. In addition to that, further summing operations have to be performed on data which are transmitted from the right shift logic 14. Thus, the arithmetic and functional unit 12 furnishes several operations within the sequence of steps to be performed for generating a tone. That is why the operation of the arithmetic and functional unit 12 and its devices have to be timed properly for achieving adequate cooperation with various other units of the digital tone generator.

The block diagram of the arithmetic and functional unit 12 is shown in the part of FIG. 2B which has to be described yet. It contains an arithmetic and logical unit (ALU) 230 which main characteristic is a high speed parallel mode of operation. The ALU 230 can be implemented in a conventional manner; for example, it can be composed of commercially available integrated circuits such as "74 LS 181" and "74 LS 182". The first mentioned integrated circuit is a 4-bit high speed parallel ALU which is expandable in 4-bit increments to operate at any word length with a minimum loss in performance. This characteristic is even improved by also providing the second mentioned component. The "74

LS 182" is a look-ahead carry generator designed for used with the aforementioned 4-bit ALU to achieve high speed carry look-ahead over word lengths of more than four bit. For the present application, the ALU 230 can perform arithmetic operations on 16-bit words in parallel when four 74 LS 181's and one 74 LS 182 are connected in accordance with the instructions of the manufacturer, for example, Signetics. Since such ALUs have been implemented for a great variety of applications, design details are quite familiar to those skilled in the art. Further detailed description of the implementation of the ALU 230, therefore, is deemed not to be necessary.

The arithmetic and functional unit 12, furthermore, includes four registers 231 through 234 which are used as temporary data buffers interfacing further buses of the digital tone generator with operand inputs OA and OB of the ALU 230. Respective inputs of the first and second register 231, 232 are connected to the attenuated sine data bus AS-BUS, whereas the inputs of registers 233 and 234 are connected by an accumulated data bus AD-BUS to outputs of the ALU 230. Each of the outputs of the first register 231 is connected to a respective one of the first operand inputs OA of the ALU 230, whereas corresponding outputs of the second and the third registers 232, 233 are commonly connected to a corresponding one of the second operand inputs OB of the ALU 230. The outputs of the fourth register 234 are connected to a further bus, the C-BUS which is the transmission path between the arithmetic and functional unit 12 and the compander and attenuator 15.

Besides the main purpose which is to de-couple data transmission across one of the buses supplying the input side of the ALU 230 and an operation of the ALU itself, a detailed explanation of the mode of operation of registers 231 through 234 has to be postponed until it has been described in detail how sine amplitude values are obtained. For the time being, the attention may be drawn to the labelling of those registers indicating that each register buffers temporarily sine data with respect to a specific frequency component f1 through f3 of a tone or composites of those frequency components.

The Sine Generator (FIGS. 2C, 4 and 5)

The sine generator 13 represented in more detail by a block diagram shown in FIG. 2C is connected to the arithmetic and functional unit 12 and receives from that unit thirteen address bits which determine a complete destination for a sine amplitude value to be generated. The most significant bit is referenced SIGN, whereby it is indicated that this bit determines the positive or negative half of a sine wave. The second most significant bit, the so-called quadrant bit is referenced as QUAD. This symbol indicates that by means of the condition of this bit one of both quadrants within the positive or negative part of a sine wave form is determined. The remaining 11 address bits are passed to the sine generator 13 across the sine address bus SA-BUS.

A set of EXCLUSIVE OR-gates (EX OR-gates) is arranged at the input side of the sine generator 13, as schematically indicated by a block referenced 240. Each of these EX OR-gates is associated with a respective one of the lines of the sine address bus SA-BUS and is connected to that bus line by a first input. The second inputs of all EX OR-gates are commonly connected to the input line carrying the quadrant bit QUAD. The outputs of these EX OR-gates are connected in parallel to respective inputs of a latch 241 providing an address register for a sine table ROM 242. The address of this sine table ROM is completed by a further address bit referenced as +3 db, 0 db SEL which bit is generated by the gain and cadence control 17. The sine table ROM has a capacity of 4,096×12 bits and is implemented by two commercially available integrated circuits each comprising a capacity of 4,096×8 bits. The implementation is such that a data word in the sine table ROM comprises 12 bits, and a total of 4,096 memory locations is provided. The +3 db, 0 db SEL bit is the most significant bit of a ROM address thus dividing the sine table ROM 242 into two halves each comprising 2,048 memory locations and containing a separate sine table. Corresponding entries of these tables are associated with the same phase value Φ determined by the 11 less significant address bits and store respective sine amplitude values which are spaced apart by 3 db.

Having described the main components of the sine generator, the characteristics of the layout of the sine table ROM and how it is addressed will now be described in the following with reference to FIGS. 4 and 5. FIG. 5 shows a full 2π period of a sine wave form with reference to a time axis t. Let it be assumed that the corresponding time axis t is divided into 8,192 small fractions of time. The phase values Φ of those fractions correspond to specific sine amplitude values. The same relationship is also represented in the circular diagram, shown in FIG. 4, correspondingly divided into 8,192 sectors. Evidently, if a fixed fractional amount Δt of time is postulated the position of the pointer is dependent upon the angular velocity with which the pointer is rotating. In other words, if Δt is a constant, that is, in the present application the time distance between two samples of a signal in a PCM system, a phase angle associated therewith will be a function of the time available to complete a cycle.

Therefore, basically a single wave form in form of a sine wave table can be used for generating sine amplitude values of a multiplicity of frequencies. If one wants to obtain the sine value for a frequency of 1000 Hz, for example, the cycle indicated in FIG. 4 by a circle will be compassed 1000 times per second or one cycle will be completed within 1 msec. Correspondingly, for a frequency of 500 Hz, the cycle period would be 2 msec. If the time axis of the sine wave, as shown in FIG. 4, is divided into 8,192 fractions covering in total one period of the sine wave, and if it is further assumed—as conventional with PCM systems—that 8,000 samples are taken per second, that it can easily be calculated that in case of the frequency of 1 KHz, about 8 samples can be taken during a 2π period, whereas in case of the second frequency of 500 Hz, the same sine wave is described by 16 samples. This means that the frequency individual phase values ΔΦ have the ratio of 2:1.

This indicates clearly that the values of the phase constants ΔΦ are characteristics for each frequency. Accordingly the distance between two consecutive sine table addresses with respect to one and the same frequency is determined by that phase value ΔΦ of that frequency. If the sine table has sufficient resolution which is equal to or greater than 8,000 time periods Δt for one time period than any frequency up to almost 4 KHz can be generated with sufficient quality. Evidently the addressing scheme should be based upon the binary number system. This is desirable since digital components are used to implement the digital tone generator. The time axis of the sine wave stored in the sine table ROM 242 therefore is divided into 8,092 differential time periods Δt, as indicated in FIGS. 4 and 5. The symmetrical shape of the sine function, furthermore, has the advantage that in fact the sine wave table can be composed of sine amplitude values of just one quadrant and still cover a full 2π period, in conjunction with the one of four combinations of the two most significant sine address bits, the sign bit SIGN and the quadrant bit QUAD. The eleven less significant sine bits transmitted across the sine address bus SA-BUS are sufficient for selecting one of 2,048 memory locations covering one quadrant of the sine wave form. Bits SIGN and QUAD are used for specifying, in combination, the respective quadrant of the sine wave form. That is the reason why these two bit positions are not used for addressing the sine table ROM 242 directly.

Now is the time for explaining in detail the mode of operation which is controlled by a quadrant bit QUAD. Regarding the course of the sine wave for a full 2π period, obviously sine amplitude values rise with increasing phase values within a first quadrant. In the course of the second quadrant, the further increasing phase values Φ are associated with falling amplitude values. The same condition applies for the negative half of the sine wave form except for the sign of the sine amplitude values.

If a sine table covering just one quadrant is provided for generating sine amplitude value of a 2π period, therefore, the addressing scheme of such a table is somewhat more difficult. With respect to the design of such a sine wave table, two requirements are predetermined by a characteristic of the sine function. A transition from a quadrant to the next quadrant has to be recognized; and in the course of the first and the third quadrant consecutive addresses should point to increasing sine amplitude values whereas the contrary applies during the course of the second and fourth quadrants, in accordance with the known trigonometrical function $$\sin \Phi = \sin (\pi - \Phi).$$

In the present invention, these requirements are met by means of the quadrant bit QUAD, that is by the manner how it is generated and how it is evaluated. A change of conditions of the quadrant bit is generated whenever an overflow occurs in adding the phase constant ΔΦ to a current phase value Φ. Such a change of the signal state of the quadrant bit indicates a transition from one quadrant to the next quadrant. This change is employed for modifying the addressing scheme from an incrementing into a decrementing order and vice versa. This is achieved by means of the EX OR-gates 240 forming the input stage of the sine generator 13.

TABLE 2

| CTROL | DATA | EX OR OPERATION |
|---|---|---|
| 0 | 000 | 000 ↓ |
| 0 | 001 | 001 ↓ |
| 0 | 010 | 010 ↓ |
| 0 | 011 | 011 ↓ |
| . | . | . ↓ |
| . | . | . ↓ |
| . | . | . ↓ |
| 0 | 110 | 110 ↓ |
| 0 | 111 | 111 ↓ |
| 1 | 000 | 111 ↑ |
| 1 | 001 | 110 ↑ |
| . | . | . ↑ |
| . | . | . ↑ |
| . | . | . ↑ |

TABLE 2-continued

| CTROL | DATA | EX OR OPERATION |
|---|---|---|
| 1 | 101 | 010 ↑ |
| 1 | 110 | 001 ↑ |
| 1 | 111 | 000 ↑ |

In analyzing an EXCLUSIVE OR operation, it will become apparent that a series of consecutive binary numbers having increasing values in a rising order can be converted into the same series of binary numbers arranged in reverse order, if there is provided a control signal to one input of an EX OR-gate and the data signals associated with those binary numbers are applied to the other input. Table 2 represents a truth table illustrating an example for such an EX OR operation with reference to a 3-bit binary number series. The upper half of the table shows that the binary numbers as referenced by DATA remain unchanged by the logical operation as long as the control bit CTROL is "0". The same series of binary encoded numbers, however, will occur in its reverse order if the control bit is in its "1" state, as to be seen from the lower half of Table 2. Respective arrows indicate the rising and the falling order, respectively.

It will now be apparent that EX OR-gates 240 provided as an input stage of the sine generator 13 and controlled by the quadrant bit QUAD automatically modify the address passed to the sine table ROM 242 such that the order of selecting memory locations is automatically reversed from the rising order to a falling order, and vice versa, whenever a transition from one quadrant to another quadrant of the sine wave is reached. Thus, by employing a single logical operation carried out by a small amount of conventional digital circuits the size of the sine wave table can be cut into halves thereby achieving a substantial saving of memory capacity.

The Right Shift Logic (FIG. 2C)

It has been described in the foregoing that sine amplitude values either of +3 dbm or 0 dbm amplitude values are read out from the sine table ROM 242 of the sine generator 13. One of the main characteristics of the digital tone generator is that any frequency or frequency component can be supplied in a wide range of mean amplitude values from +3 dbm down to −45 dmb. This is achieved by attenuating the binary encoded sine amplitude values read out from the sine table ROM 242 of the sine generator 13.

A first attenuation of frequency amplitudes is performed by the right shift logic 14 arranged at the output side of the sine table ROM 242 of the frequency generator 13. An attenuation of 6 dbm of an amplitude value means that the attenuated amplitude has half the absolute value of the original amplitude. This 6-db attenuation of a binary encoded signal can be achieved by a right shift performed on the binary code pattern. By a series of right shift operations on one and the same pattern thus any multiple of a 6-db attenuation can be achieved.

The implementation of such a multiple 6 db attenuating circuit, the right shift logic 14, itself is of a conventional design. There are shift matrices available in different circuit logic techniques which can serve the present purpose. In TTL technology, a circuit arrangement composed of components AM 25S10 manufactured by AMD could be used if the relatively long propagation of this device is still acceptable. For high speed operation, an ECL circuit arrangement may be preferable. The component F100158 of Fairchild comprises such a combinatorial network in the form of an 8-bit shift matrix. Three control lines are internally decoded to define the number of places which an 8-bit word present at the inputs is shifted and presented at the outputs. The component also contains a mode control input and a control signal passed to this input can either initiate a so-called "LOW BACKFILL" or an end-round shift which is commonly referred to as "Barrell Shifting". The latter mode of operation applies in the given situation. According to the description of the manufacturer, the component is easily expandable to a 16-bit shift matrix. As determined by a 3-bit shift control signal, this matrix can perform any number from 0 to seven shifts on a bit pattern presented at its inputs. A further detailed description of the shift matrix arrangement of the right shift logic 14, therefore, is deemed not to be necessary.

Accordingly, FIG. 2C just represents the schematic block diagram of the right shift logic 14 having 12 inputs connected to the respective outputs of the sine table ROM 242 of the sine generator 13 and having 12 corresponding outputs. There are also indicated the three shift control inputs which are connected by three parallel lines to the gain and cadence control 17 generating respective shift control signals determining the number of right shift operations to be performed by the right shift logic 14 with respect to a current sine amplitude value. It may be mentioned that the right shift logic 14 preferably also includes an output stage composed of a 12-bit latch for buffering the attenuated sine amplitude value until an output operation is enabled by a shifter out signal SHIFT OUT which is one of the steering signals generated by the sequencing unit 10. Whereas also this output latch of the right shift logic is not shown in detail in FIG. 2C, a further latch for buffering the sine bit SIGN correspondingly is represented for the reason of better comprehension. The 12 parallel outputs of the right shift logic 14 and the sign bit latch are commonly connected to the attenuated sine data bus AS-BUS which connects the right shift logic to the arithmetic and functional control shift 12.

The Generation of Attenuated Sine Amplitude Values (FIGS. 2A, 2B, 2C, 3)

Having described with reference to FIGS. 2A through 2C the structures of the sequencing control unit 10, the frequency generator 11, the arithmetic and functional unit 12, the sine generator 13 and the right shift logic 14, a summary of the operation of these units will now be given with respect to one tone associated with a time slot for either tone highway A or tone highway B.

As described in detail with reference to FIG. 2A, the sequencing control unit 10 passes a frequency address via the frequency address bus FA-BUS to the frequency generator 11. This frequency address specifies corresponding memory locations in the ΔΦ PROM 220 and the Φ RAM 221 of the frequency generator 11 as described with reference to Table 1. Assuming now that this frequency address is the address of the first word of a 4-word block associated with one tone channel, the current phase value Φ corresponding to a sine table address is generated by the ALU 230 of the arithmetic and functional unit 12. This current phase value Φ is passed to the latch 222 of the Φ RAM 221 and stored back into the same memory location which has been read out. In addition, the phase value Φ is present at the EX OR gates 240 and, dependent upon the status of the quadrant bit QUAD, the unchanged or the converted address for the sine table ROM 242 is stored in the sine generator latch 241.

Under control of the gain and cadence control unit 17 either the 0 db table or the +3 db table of the sine table ROM 242 is selected and the sine amplitude value corresponding to the present sine address is read out and passed to the right shift logic 14. This logic performs, under control of the gain and cadence control unit 17, a predetermined number of shifts and passes the attenuated sine amplitude value via the accumulated sine data bus AS-BUS back to the arithmetic and function control unit 12. At the time when the attenuated sine data corresponding to the first frequency component f1 of a tone occur at the attenuated sine data bus AS-BUS the first register 231 of the arithmetic and function control unit 12 is enabled to store this data word. The described sequence of operation with reference to the generation of the sine amplitude value of the frequency component f1 is also represented by the group of steering signals shown in the left part of timing diagrams in FIG. 3.

Regarding the first group of timing diagrams in FIG. 3 it is obvious that a new frequency address occurs when the least significant bit FA0 of the frequency address changes its condition. This frequency address now determines the second word of the same 4-word block in both the ΔΦ PROM 220 and the Φ RAM 221 of the frequency generator 11. The same series of steps, as described before, is performed with respect to the second frequency component f2 of the tone except for the operation during the last step. The attenuated sine data now present on the attenuated sine data bus AS-BUS are stored into the second data register 232 of the arithmetic and function control unit 12.

The described series of steps is then performed with respect to the third frequency component f3. As to be seen from FIG. 2B, the attenuated sine data associated with this frequency component f3 again will be stored in the first register 231 of the arithmetic and function control unit 12. Therefore, the intermediately buffered attenuated sine data word associated with the first frequency component f1 has to be read out prior to storing the respective word of the third frequency component f3. The last two timing diagrams of FIG. 3 reflect this condition. Prior to storing the attenuated sine data word of the third frequency component f3 the respective data words of the first and second frequency components f1 and f2 are read out from the respective registers 231 and 232 and passed to the ALU 230 for being added. The ALU 230 sends the result back to the third register 233 of the arithmetic and function control unit 12. Thus, the first register 231 is free to obtain the attenuated sine data word from the attenuated sine data bus AS-BUS.

It may be recalled that the next frequency address is associated with the fourth word of the 4-word block which is unused, as to be seen from Table 1. This instance offers some time to perform the remaining steps for adding the attenuated sine data values of the three frequency components of a tone.

The first and third registers 231 and 233, respectively, are read out and the ALU 230 adds the presented data to an accumulated sine amplitude value which contains now all three components. This value is passed via the accumulated data bus AD-BUS to the fourth register 234 and temporarily stored for transmission across the C-BUS to the compander and attenuator 15 at the time when the first address for the next 4-word block of the ΔΦ PROM and the Φ RAM 221 is generated. An overlap with respect to operations is now apparent. The compander and attenuator 15 processes data of a tone simultaneously to the units herein described before in detail but with reference to data of the previous tone.

Figure 2D:
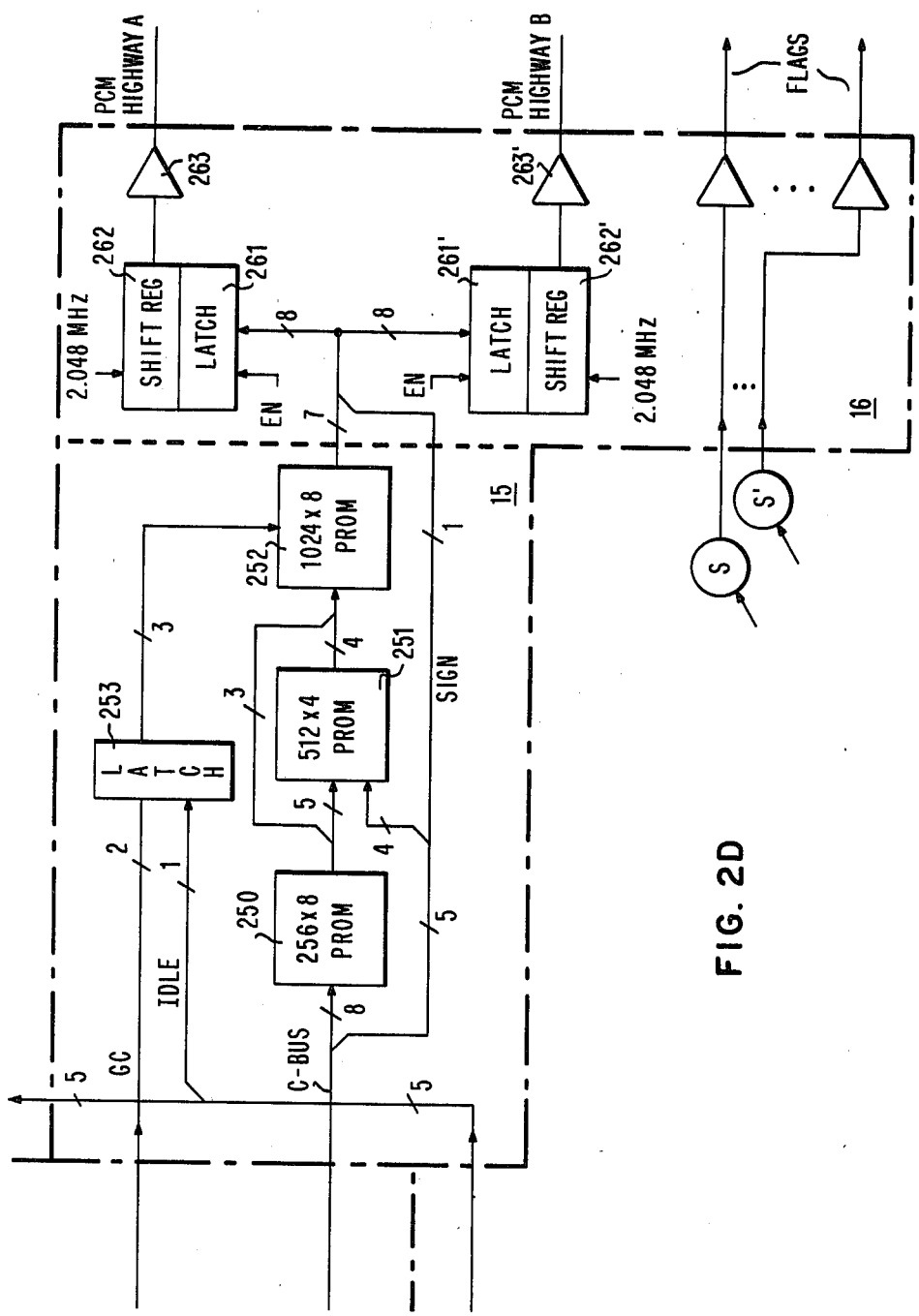
FIG. 2D shows a detailed block diagram of a compander and attenuator unit adapted to modify the amplitude representation of digital encoded tones and of an output stage connecting the tone generator to PCM highways of a telecommunication system.

The Compander and Attenuator Unit (FIG. 2D)

It has been described hereinbefore that a compander and attenuator unit 15 is interconnected with the arithmetic and function control unit 12 by the C-BUS. The main reason for this sub-unit of the digital tone generator is to achieve still more flexibility of this device with respect to different applications.

It may be recalled that in a PCM telecommunication system a sample usually is encoded into a 8-bit PCM word. The compander and attenuator unit 15, however, receives from the arithmetic and functional unit 12 pre-attenuated sine data encoded into 12-bit patterns and a sign bit additionally. The compander and attenuator unit 15 compresses this 12-bit pattern into a 7-bit pattern, or in other words, converts the encoding of the sine amplitude value.

PCM telecommunication systems are used in different countries having different standards for encoding PCM samples. The compander and attenuator unit 15, therefore, should be designed flexibly so as to meet requirements according to those standards and to be able to convert linear encoded sine amplitude values into companded PCM samples according to the so-called "A-Law" or "μ-law". Both encoding schemes are based upon a CCITT recommendation. Encoding according to A-Law primarily is conventional with PCM30 telecommunication systems preferably used in Europe, and μ-Law primarily is employed with PCM24 telecommunication systems which are primarily installed in the United States. Both encoding schemes are based upon non-linear quantization, that is small quantization intervals are used with respect to low amplitude values and larger quantization intervals apply for large analog signal amplitudes. The characteristics of these encoding schemes based upon detailed CCITT recommendations are quite familiar to those skilled in the art of PCM telecommunication systems. It is, therefore, deemed not to be necessary to describe in all details the composition of the compander and attenuator circuit 15 and the block diagram shown in FIG. 2D is supposed to be sufficient.

The block diagram shows, as far as the companding circuit arrangement is concerned, a first and a second compander PROM 250 and 251, respectively. The first compander PROM 250 is a 256×8 bit PROM receiving as address bits the eight most significant bits of a linear sine amplitude code passed to the compander and attenuator unit 15 across the C-BUS. The four least significant bits of this code and the five most significant output bits of the first compander PROM 250 are passed to address inputs of the second compander PROM 251. This PROM is a 512×4 bit PROM which four outputs together with the three least significant outputs of the first compander PROM 250 carry a seven bit pattern of the companded sine amplitude value.

The second characteristic of the compander and attenuator unit 15 is to perform a second attenuation operation. It has been pointed out hereinbefore that the linear sine amplitude value can be attenuated in 3 db steps using, in combination, either the ∅ db sine wave table or the +3 db sine wave table and by applying a predetermined number of right shifts to a read out sine amplitude value wherein each right shift corresponds to a 6 db attenuation. These 3 db steps are too wide to meet all possible requirements with respect to the amplitudes of different tones which may be used in different countries. It is, therefore, desirable to enlarge the resolution of the range of amplitudes of tones to be generated.

The compander and attenuator unit 15 to this reason also includes a third compander PROM 252 which is a 1,024×8 bit PROM. The seven less significant address inputs of this third compander PROM receive the companded sine amplitude value whereas the three most significant address inputs of the third compander PROM 252 are connected to outputs of a compander latch 253. This latch receives at its inputs the two bits GC∅ and GC1 of the attenuator code generated by the ΔΦ PROM 220 of the frequency generator 11. A third input of the compander latch 253 receives a control bit generated by the gain and cadence control unit 17. This control bit controls the on/off condition of a tone and determines in its off condition that an idle code is produced by the third compander PROM 252 which is associated with the tone-off condition. Depending upon the condition of the 2-bit attenuator code a 0, 1 or 2 db attenuation of the companded sine amplitude value present at the remaining address inputs of the compander PROM 252 is generated in a conventional manner. The third compander PROM 252, therefore, is nothing else but a programmable code converter and its structure is based upon pure binary logic. A detailed description of the layout of the third compander PROM, therefore, is deemed not to be necessary, since a practical implementation is very straightforward. Only seven outputs of this compander PROM are used for generating the bit patterns of attenuated and companded sine amplitude values corresponding to those values present at the respective inputs. The sign bit SIGN is added to such a seven bit pattern as the most significant bit, thus completing a PCM word.

The Output Stage (FIG. 2D)

The digital tone generator generates 64 PCM samples within a frame interval. Each of these samples are alternately assigned to the first or second PCM highway A, B as described. The output stage, shown schematically in FIG. 2D, therefore, has a symmetrical structure. There are provided two branches each associated with a respective one of the PCM highways. The two branches each are composed of a buffer register 261, 261' and a parallel-to-serial converter 262, 262' clocked by the 2.048 MHz clock for transmitting a PCM sample in synchronization with the pulse frames transmitted across the associated PCM highway A, B. As schematically indicated in the drawing, the two data buffers 261, 261' each are supplied with a control signal EN enabling the register to receive the PCM word presented at its inputs. By means of the enabling signals also generated by the sequencing control unit 10 alternately the current PCM word is buffered in the data buffer 261 associated with the tone highway A or the data buffer 261' associated with the second tone highway B. The parallel-to-serial converters 262, 262' can be designed as shift registers each having a serial output connected to an input of an amplifying stage 263, 263'. Such amplifiers are conventional for interfacing outputs of a PCM device and the PCM transmission line.

The output stage also includes similar amplifying stages for transmitting further control signals such a flags on separate lines to the centrally located switch, not shown. These control signals will be described in more detail later.

The Gain and Cadence Control (FIGS. 2E, 2F, 6 and 7)

The detailed description of different sub-units of the digital tone generator as set forth hereinbefore did not emphasize details of the difference in generating continuous or interrupted tones. It is evident that both types of tones have to be generated to supply all the different call progress and test tones in a telephone switch. As for example, in setting up a telephone connection according to American standards, a continuous dial tone composed of two frequency components of 350 Hz and 440 Hz announces that the subscriber line is available for a call set-up. If the called station is not available, a busy tone will be received. This tone is composed of two frequency components of 480 Hz and 620 Hz and appears with a 50% duty cycle wherein the tone is on for 0.5 seconds. Foreign countries have different standards, as everybody knows from international calls.

It is, therefore, a need not just to generate continuous tones but also to provide for specific cadence patterns which have programmable turn-on and turn-off times. An investigation of world-wide requirements has proved that the cadence cycle time which is the time of the longest repeating cadence cycle can be limited to eight seconds in steps of 4 msec each. Since many of the cadences required have the same general format with different time constants, it is possible to limit the programmability to the time constants and to a selection of the format which should be used for each source cadence. Thus, 16 different cadences can cover the requirements for the American and most other world markets.

Any one of the 64 channels of the digital tone generator may be assigned to one of these 16 cadences. The gain and cadence control, as illustrated in block diagrams shown in FIGS. 2E and 2F, monitors the progress of the cadence patterns simultaneously. It is an essential characteristic of the digital tone generator according to the present invention that these discontinuous tones defined by a cadence pattern are not "hard switched", i.e. just turned on and turned off. Any abrupt change of a tone would result in an annoying click at the time of interruption and would also produce quite some disturbance in receivers and other equipment of modern automatic exchange systems, which is even of more concern. Such automatic equipment reacts violently to any abrupt energy change. Any hard switching can be interpreted as applying a step function causing oscillating and measures have to be taken for allowing appropriate settle time until the signal state is stable. The solution to this problem is to provide for a smooth build up and decay of tone amplitudes in a cadence pattern by "soft switching". Soft switching, according to the present invention means ramping of tones and providing for a coherent modulation of sine tones synchronized with the zero crossings of each frequency component during ramping times. This means, in other words, that amplitude changes are limited to a specific rate, here preferably 3 db per cycle and any changes of amplitude may occur just at zero crossings of a sine wave. By means of this ramping characteristic the impact of a characteristic distortion occurring during the transient state of an interrupted tone can be kept to a minimum.

The gain and cadence control, therefore, basically has to monitor the progress during a cadence cycle each associated with a respective one of the tone channels and has to generate control signals indicating the current state in synchronization with the procedure for generating the corresponding tone.

Figure 2E:
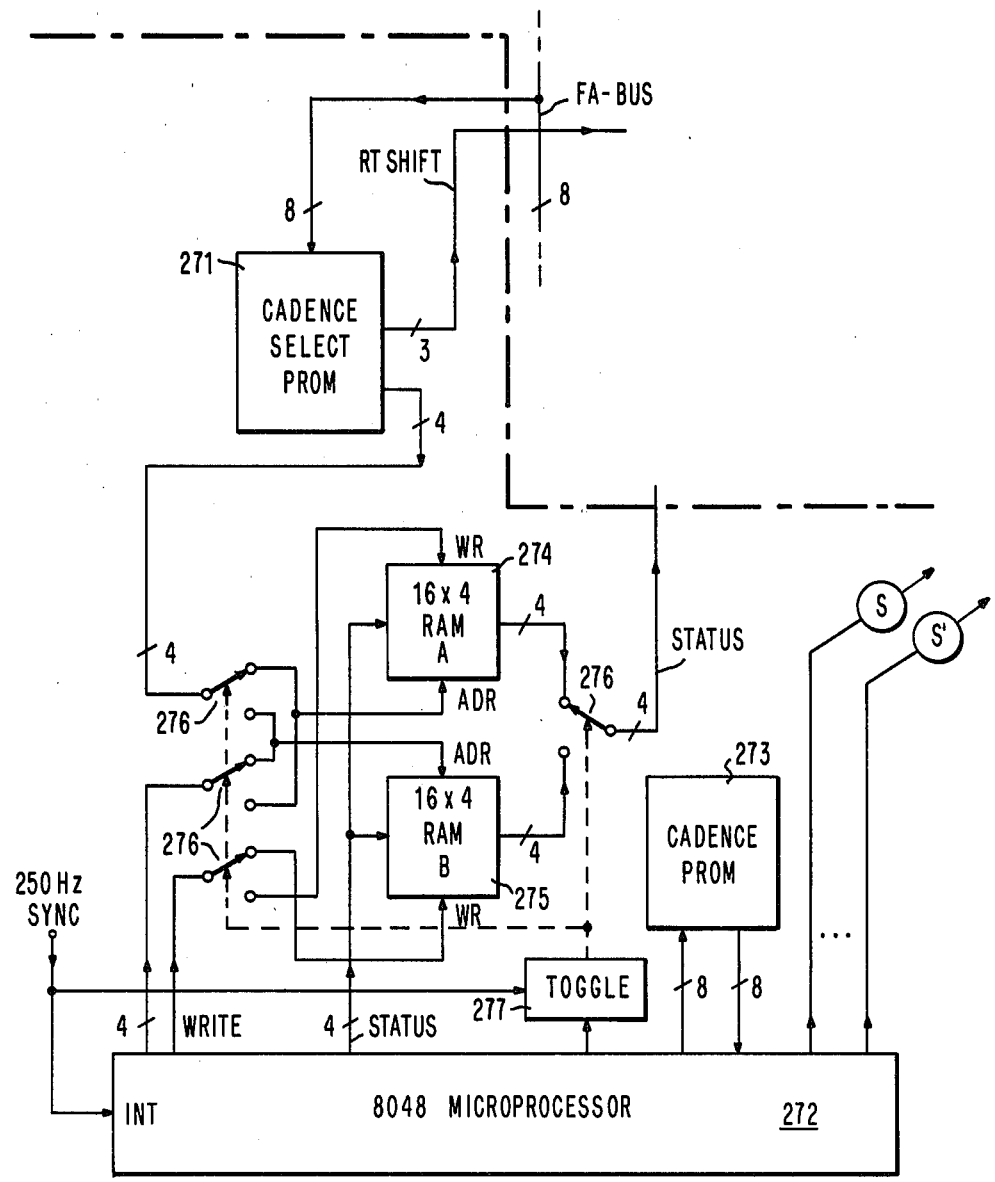
FIG. 2E shows a block diagram of a cadence control unit including a microprocessor system for generating status information of cyclically repeated discontinuous tones.

As to be seen from the block diagram in FIG. 2E, the cadence control is provided with a cadence select PROM 271. The cadence select PROM is composed of a 256×8-bit PROM chip having a storage capacity of 256 words each consisting of 8 data bits. The design of the cadence select PROM is illustrated in Table 3. According to this table the memory is functionally divided into 64 4-word blocks, each of which is programmed to select a desired tone cadence and a tone on/off attenuation. Each block is assigned to one of the two PCM tone highways A or B and to one of the 32 time slots. In each 4-word block one of the words is unused, since it is assumed that each tone is a composite of not more than three frequency components f1 through f3. In Table 3, the eight bits of a PCM word are designated by D7 through D0 wherein D0 is the least significant bit. The three least significant bits D2 through D0 determine an attenuation code specifying the hold level of the respective frequency value. The three bits of this attenuation code are used to select up to 7 steps of 6 db attenuation each. The next following more significant bit D3 is an ON bit which is set to "1" when a continuous tone is desired instead of a cadence. A specific one of the 16 cadences is selected by a 4 bit code comprising the four most significant bits D7 through D4.

TABLE 3

| PROM ADR. | CHAN | TONE | $2^7$ | $2^6$ | $2^5$ | $2^4$ | $2^3$ | $2^2$ | $2^1$ | $2^0$ |
|---|---|---|---|---|---|---|---|---|---|---|
| 0 | A0 | f1 | D7 | D6 | D5 | D4 | D3 | D2 | D1 | D0 |
| 1 |  | — | X | X | X | X | X | X | X | X |
| 2 |  | f2 | D7 | D6 | D5 | D4 | D3 | D2 | D1 | D0 |
| 3 |  | f3 | D7 | D6 | D5 | D4 | D3 | D2 | D1 | D0 |
| 4 | B0 | f1 | D7 | D6 | D5 | D4 | D3 | D2 | D1 | D0 |
| 5 |  | — | X | X | X | X | X | X | X | X |
|  |  |  |  |  |  |  |  |  |  |  |
| FF | B31 | f3 | D7 | D6 | D5 | D4 | D3 | D2 | D1 | D0 |

Each address input of the cadence select PROM 271 for selecting one of the 256 storage locations is connected to a respective one of the lines of the frequency address bus FA-BUS whereas the three output signals associated with the three less significant bits D2 through D0 of a PROM word are given out to the gain control unit which is illustrated in FIG. 2F. The outputs associated with the four most significant bits D7 through D4 of a storage location of the cadence select PROM 271 determine the currently selected cadence by means of a four bit address.

Furthermore, there is provided a microprocessor system 272 and associated with it a further programmable read only memory, the cadence PROM 273. The cadence PROM 273 is a single 1,024×8-bit PROM chip which serves as external memory of the microprocessor system 272.

TABLE

| ADR | D7 | D0 | D7 | D0 |
|---|---|---|---|---|
| 000<br>01F | CADENCE<br>PATTERN #1 | 000<br>001 | STEP #1 LOW BYTE<br>HIGH BYTE | |
| 020<br>03F | CADENCE<br>PATTERN #2 | 002<br>003 | STEP #2 LOW BYTE<br>HIGH BYTE | |
| | | 004<br>005 | STEP #3 LOW BYTE<br>HIGH BYTE | |
| 1E0<br>1FF | CADENCE<br>PATTERN #16 | | | |
| 200<br>3FF | DIAL PULSE<br>PATTERN | 01E<br>01F | STEP #16 LOW BYTE<br>HIGH BYTE | |

Table 4 illustrates schematically that the cadence PROM 273 is programmed for 16 different one cadence (modulation) patterns. Each cadence pattern consists of up to sixteen steps. The information for each step is located in two consecutive bytes and provides a cadence time constant, associated with this step and frequency flags. Also, programmed in the cadence PROM 273 is the dial pulse program pattern.

FIG. 6 illustrates the layout of the cadence PROM 272 with respect to a cadence step. The time constant of each step is determined by ten bits which are located in the two consecutive bytes and consists of the eight bits of the low byte and two bits of the high byte. By means of these ten bits any time constant can be chosen from 4 ms to 8 seconds in 4 ms increments. The "on" or "off" condition of the frequency flag bits, located in the high byte indicate which frequency components of the tone are available or de-activated during the corresponding step of the cadence pattern. A binary "1" of a frequency flag turns on the respective frequency component and the contrary applies if the flag bit is set to "∅". It is important that the frequency "on" period includes the ramp-up and ramp-down times.

A software flag is a signal to the group processor of the central switch and indicates when a tone is on or off. A flag select code consisting of two bits of the high byte specifies four conditions including no flag at all, or either one of the flags 1 through 3. There is still a further bit of the high byte which is an enable bit controlling the ramp-up and ramp-down modulation function in conjunction with the 6 db attenuation code stored in the cadence select PROM 271. As the program performed by the microprocessor system 272 steps through the cadence pattern locations, the enable bit goes from "∅" to "1" causing a ramp-up toward the final hold tone levels. When it goes from "1" to "∅", it causes a ramp-down toward the off level. Two consecutive zeros in the enable bit cause the second step to be skipped and the step count to be zeroed.

The layout of the dial pulse pattern, shown in FIG. 7, is similar to the cadence step pattern. The dial pulse time constant is only eight bits as compared to the ten bits of the cadence pattern and is entirely located in the low byte of the dial pulse entry. Four less significant bits of the high byte are provided for dial pulse status bits DP1, DP2, DP3 and DPW. The dial pulse status bits indicate the current state of the dial pulse output signal, wherein "1" indicates the active state and "∅" applies to the contrary. The following three bits are unused and the most significant bit of the high byte contains a dial pulse last step (LS) bit indicating that this is the last step and a restart should be initiated at the dial pulse timer's expiration.

Associated with the output of the microprocessor system 272, there are provided two system RAM banks; RAM A 274 and RAM B 275. The design of both system RAM banks 274 and 275 is identical. Each RAM bank is composed of a 16×4-bit RAM memory for storing the status of the sixteen cadences. The status information reflects the current condition of the mentioned frequency flags and the enable bit which is set to "∅", if none of the frequency components is activated. The arrangement of these two system RAM banks is such that they operate as interfaces between the microprocessor system 272 and the remaining units of the digital tone generator. The microprocessor system 272 monitors the progress of each cadence in accordance with the contents of the cadence PROM 273 and stores the current status in a selected location of one of the two system RAM banks. Simultaneously the previously stored status information is read out from the other system RAM bank for controlling the ramp-up/down modulation.

The assignment of the system RAM banks 274 and 275 is exchanged every other 4 ms, the time unit of the cadence time constants. For performing this operation, there is provided a multi-function switch 276, as schematically indicated in FIG. 2E. This multiple switch has a first arm related to a write signal output of the microprocessor system 272 for connecting this output alternatively with one of the write signal inputs WR of system RAMs 274 and 275. A second multiple switch arm is related to four address outputs of the microprocessor system 272 and connects alternately these outputs with respective address inputs ADDR of either the system RAM bank 274 or the system RAM bank 275. Similarly a third multiple switch arm is related to the cadence select PROM outputs and operates in a converse mode. It connects the four most significant outputs of the cadence select PROM 271 with the address inputs of one of the system RAM banks which is currently not selected by the microprocessor system 272. A fourth multiple switch arm selectively connects the data outputs of the first and the second system RAM bank with a signal line which carries the status information controlling the ramp-up/down modulation to the gain control unit represented in FIG. 2F. The arbitrarily chosen position of the multiple switch 276 represents a condition wherein the first system RAM bank 274 is currently associated with the cadence select PROM 271 and has activated data outputs for passing the intermediately stored status information to the gain control unit shown in FIG. 2F. Accordingly, the second system RAM bank 275 is currently associated with the microprocessor system 272 for storing the current status information. The switch positions of the multiple switch 276 are controlled by a toggle flip-flop 277 as indicated in FIG. 2E by dotted lines. The data input of flip-flop 277 is connected to the microprocessor system 272 and a clock input receives the superframe synchronization signal of 250 Hz. The microprocessor system thus initiates a change of the position of the multiple switch 276 every 4 ms, if applicable.

In the following, the characteristics of the microprocessor system 272 will be described in more detail. It can be implemented by a microprocessor system 8048 manufactured by Intel. This system is a well known 8-bit processor system and is designed for a variety of uses by means of optional devices for system expansion and a comprehensive set of instructions. The system in itself has been described in MCS-48 Microcomputer User's Manual published by Intel in 1976 which is incorporated herein by reference. A detailed description of the microprocessor system itself therefore, is deemed not to be necessary and the following description is rather limited to the specific application according to the present invention.

The operation of the microprocessor system 272 employed for controlling the progress of cadences and dial pulses may be best understood from flow charts of an operating program using the information stored in the cadence PROM 273. Those flow diagrams are represented in FIGS. 8 through 12.

This program is the control means for generating gain and cadence characteristics which control all information to be transmitted onto the speech highways A and B. The processor 272 fetches from the cadence PROM 273 used as its external memory time counts and status nibbles which are transmitted to the system RAM banks 274 or 275. Sixteen separate timings and status sequences are being processed simultaneously in the processor.

The Operation Of The Microprocessor System (FIGS. 8–12)

Figure 8:
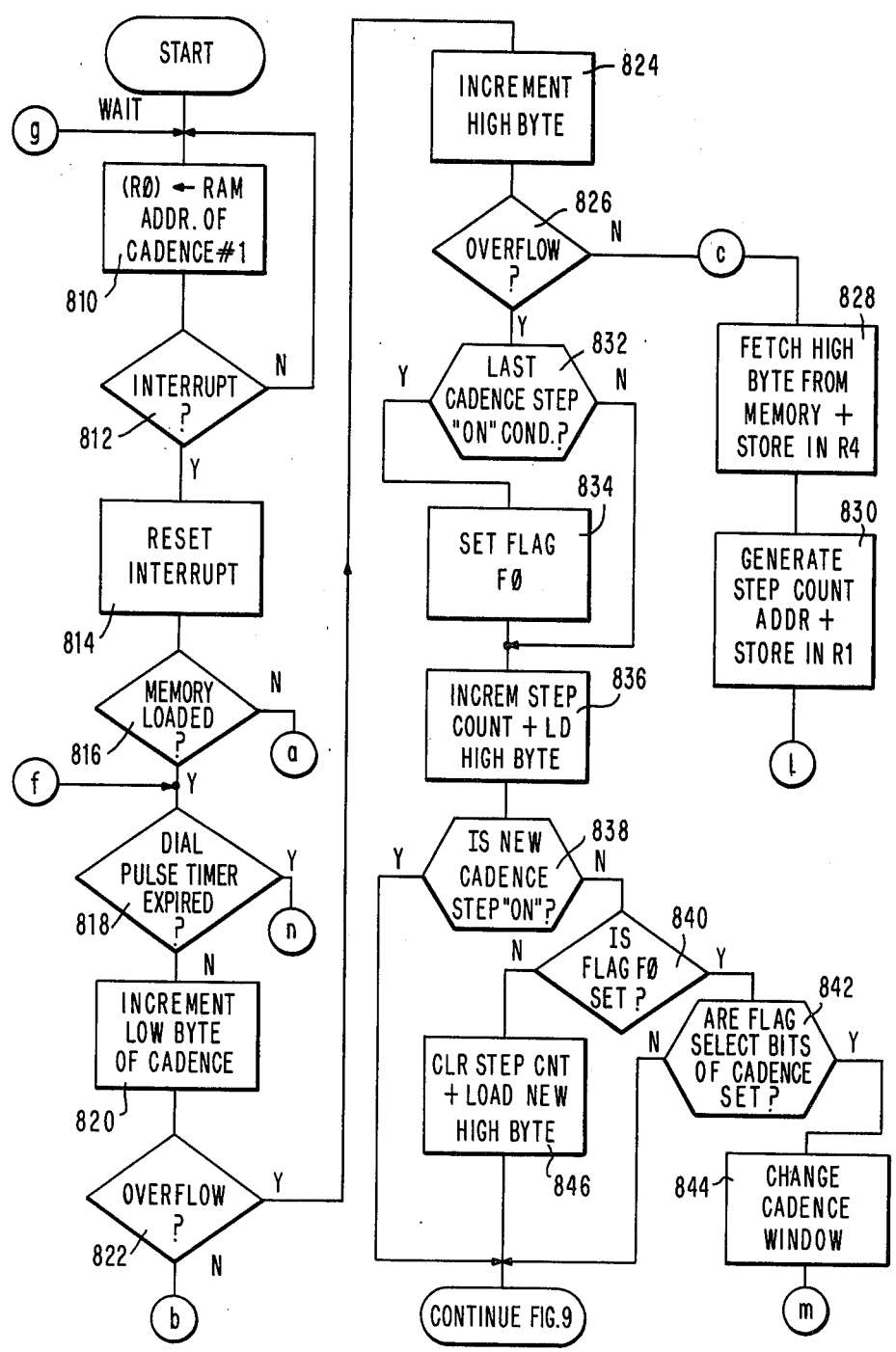
FIGS. 8 and 9 show flow charts representing a main routine of the microprocessor system.
Figure 9:
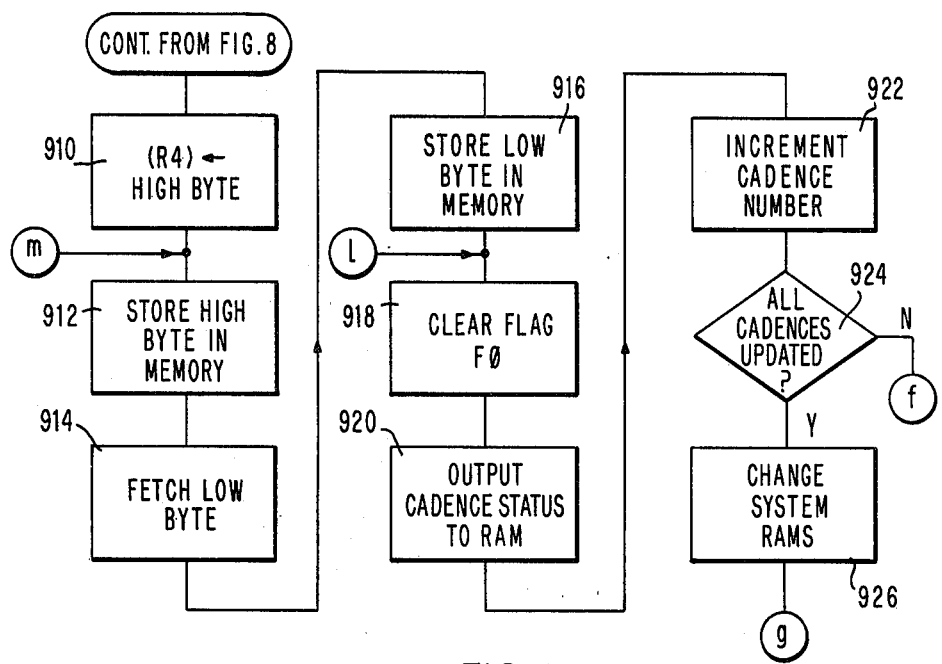

The Main Routine (FIGS. 8 and 9)

The flow charts shown in FIGS. 8 and 9 represent the main program routine. At the start of the program a wait condition is initialized. A working register R0 of the microprocessor is loaded with a first resident memory address, as indicated in block 810, by means of a move instruction specifying a data word to be transferred into this register. A test, indicated by block 812, checks if an interrupt is present. As to be seen from FIG. 2E, an interrupt signal is occurring once every 4 ms for synchronizing the progress of the microprocessor program with the operation of the remainder of the digital tone generator. If there is no interrupt signal, the program counter of the microprocessor will be loaded with an address specifying the wait condition. Thus, the program is held in a loop until an interrupt is received.

If the interrupt signal is present, the program counter will be incremented and the interrupt condition is reset, as indicated by block 814. This is achieved by selectively setting the bit positions of the second port P2 of the microprocessor into a condition for producing an output signal for resetting the status of an interrupt signal latch, not shown in FIG. 2E.

The microprocessor has two externally accessible test pins T0 and T1, one of which is used in the present application for indicating that the resident data memory of the microprocessor system is loaded with the first steps of the 16 different cadences. The test indicated in block 816 is performed by means of one of the jump instructions of the microprocessor passing the control to a subroutine "LOAD RAM" by means of a directly specified address to be loaded into the program counter if the signal present at test pin T0 is "0", otherwise the program counter of the microprocessor will be incremented by 2. The jump to the load routine is referenced by a. The load routine itself will be described later with reference to the flow chart represented in FIG. 10.

In the course of the main routine, the contents of the program counter points to a test, as indicated in block 818. A timer counter of the microprocessor provides counting of external events. The 8-bit binary counter is presettable and readable by two move instructions which transfer the contents of the accumulator of the microprocessor system to the timer counter and vice versa. An overflow results in the setting of a timer flag. The state of the timer flag is testable by means of a conditional jump instruction providing the program counter directly with a starting address for another subroutine, the dial pulse routine, if the timer flag is set. The dial pulse routine is represented by a flow chart shown in FIG. 11, and will be described later.

If the timer flag is not set, the program counter will be incremented and the program proceeds to the next step which is indicated in block 820. The following steps of the program refer to tests of the timer count states of the different cadences which are started by incrementing the low byte of the cadence as specified by the resident memory address stored in the working register R0. The microprocessor system is provided with an increment instruction by which the contents of a resident data memory location as addressed by one of the working registers are incremented by one. It has now to be tested if the time count of the low byte of the cadence is presently zero which is indicated by an overflow caused by such incrementing. This test, represented by block 822, can be performed, if the incremented low byte was moved into the accumulator, by performing a jump operation on condition that the accumulator contents are not zero, as indicated by b. The jump address is the starting address of a further subroutine "Flag Change Check" which is described later in detail with respect to a flow chart shown in FIG. 12.

In the course of the main routine, the test is passed and the program counter is incremented by 2. The next two steps of the main program procedure are similar to the ones which have just been described except for incrementing now the high byte of the currently processed cadence. It may be noted that incrementing the high byte, as designated by block 824, in fact means incrementing the part of the time constant of the cadence stored in the high byte by one. Therefore, this incrementing operation is performed by loading the accumulator with an 8-bit word having a "1" in the second most significant bit position which corresponds to the position of the lower bit of the time constant stored in the high byte. The contents of the accumulator and the high byte then is added for incrementing the high byte, and the result is stored back in the high byte location of the resident data memory.

If the adding operation of the contents of the accumulator and the high byte results in an overflow of the accumulator, a carry flag is set in the program status word of the microprocessor. The conditional jump operation symbolized by block 826 can now be performed by means of an instruction which passes the control to a specified address if the carry bit in program status word is not set. In this case, as indicated by reference symbol c, a subroutine is initialized for writing into the system RAM banks. During this subroutine, as indicated in block 828, by means of the memory address stored in the working register R0, the cadence high byte is fetched and moved via the accumulator into a further working register R4 for an output routine. The first instruction performed with respect to block 830 is a move instruction for loading the contents of working register R0 into the accumulator. By means of the next instruction, the contents of the accumulator are rotated right by one bit; thereby the step count address is generated. The contents of the accumulator then are moved into working register R1. As indicated by reference symbol 1, the subroutine is completed by jumping back to the main routine and the main routine is continued as will be described later with reference to FIG. 9.

The described subroutine was initialized by a conditional jump assuming that the carry bit in the program status word was not set. The program counter is incremented by 2, if the carry bit in the program status work is set, and the procedure proceeds with the main routine to a further conditional jump as indicated in block 832. The "on" condition of a cadence refers to a state of presently sensing a tone of non-zero level. The "on" condition can be tested by checking the status of the enable bit which is the least significant bit of the high byte of the cadence. The high byte is still stored in the accumulator, and by means of one of the logical AND instructions the test indicated in block 832 can be performed. The used instruction adds the contents of the accumulator to an immediate data word masking all bits except for the enable bit. The accumulator will not be set to zero by such an AND operation, if the enable bit is "1" indicating that "on" condition. The instruction set of the microprocessor also contains a conditional jump instruction which passes the control to a specified address, if the accumulator contains all zeros at the time this instruction is executed.

If the accumulator value is not zero, the program counter will be incremented by two and the main routine proceeds to an operation symbolized by block 834. As indicated earlier, the microprocessor is provided with several flags which are accessible by users wherein two flags F0 and F1 are accessible general purpose flags. One of these flags, the flag F0 herein is used for indicating the "on"-condition of a cadence. This flag is now set to "1", since, as tested, the cadence is on "on" condition.

State "∅" of the enable bit of the currently selected cadence designates the "off" condition. The logic AND operation described with reference to block 832 results in a zero condition of the accumulator. In this case, the program bypasses the setting of flag F0.

The program continues as indicated by block 836. The carry bit indicating the accumulator overflow is cleared and the contents of the working register R0 containing the resident memory address are moved into the accumulator. For incrementing the cadence step address the instruction "rotate right through carry" of the microprocessor is carried out. Bit ∅ replaces the carry bit and the carry bit is rotated into the bit 7 position. The four least significant bits of the resident memory address stored in the working register R0 designate the step count number, as evident from the contents of Table 4 referring to the layout of the cadence PROM. The rotate right operation eliminates the least significant bit of the resident memory address which distinguishes between the low and high byte address of a cadence step. Thus, the cadence step number is stored in the least significant bit positions of the accumulator. This data is transferred to the second working register R1 and the contents of the associated resident data memory location are incremented by one whereby the address of the next following cadence step is obtained.

This data is moved into the accumulator where the higher nibble is masked. The remaining partial address specifying the next cadence step is transferred into a further working register R4 of the microprocessor system. The cadence address stored in the second working register R1 is moved into the accumulator and intermediately stored in a further working register R6. After masking the low nibble of the accumulator contents, the contents of the accumulator are swapped. By performing a logical OR-operation with respect to the accumulator contents and the contents of the fifth working register R4 in the accumulator a complete cadence PROM address comprising the currently selected cadence and the incremented step address is generated. This address is stored into the second working register R1, and the high byte of the cadence step as addressed by data in the second working register R1 is transferred into the accumulator.

The purpose of the loading of the high byte of the following cadence step into the accumulator is to test the "on" condition of this cadence step as indicated in block 838. By means of this test, subsequent cadence steps in "off" condition are detected. In general all unused cadence step locations look like "off" statuses. Therefore, two consecutive "off" statuses will invalidate the last data fetched from the cadence PROM except for one condition: an "off" state of a cadence may last longer than 4.056 seconds which corresponds to the maximum count of the timer counter. In this case, two consecutive cadence steps in "off" condition are necessary. For separating this valid condition from an unused cadence step, the program requires positioning of two valid cadence steps in "off" condition such that the first one of both steps is the last operating step in the entire string of steps of this cadence while the second one is located in the first step location.

If the test performed in accordance with block 838 indicates that the next cadence step is in "on" condition the program according to the conditional jump instruction performed will pass to the program steps of the flow chart represented in FIG. 9. Otherwise, as indicated in block 840, the status of the first flag F0 which is accessible via the program status work will be tested. Since flag F0 is set only, if the previous cadence step was in "on" condition, a change of condition from the "on" state to the "off" state is checked. This change can demand a change of software flags sent by the microprocessor to the group processor of the switch. Therefore, a further check, represented by block 842, is performed for testing the condition of the fifth and the fourth bit of the high byte of the cadence step. These bit positions are reserved for the flag select bits already described.

If one of these bit positions is not zero, the control is passed to a subroutine "cadence update" which is represented by block 844. This subroutine provides changes of the software flags dependent upon the current bit combination. It starts by intermediately storing the contents of the accumulator in the working register R4, leaving the accumulator unaltered. Then the flag select bits located in the high byte of the cadence are masked. A series of ADD instructions is performed each adding an immediate data word to the accumulator contents such that for each of three possible combinations of flag select bits an accumulator carry is generated. In conjunction with these adding operations a tree shaped series of tests is processed each testing one of the three carry conditions and resulting in changing one of the three software flags. In dependence upon which one of the three tests is passed, selectively a corresponding output of the first port P1 designated for carrying a respective software flag SW1, SW2 or SW3 is activated. Then the program returns to the main routine as indicated in FIG. 8 by m.

The routine for changing cadence windows is bypassed if the test according to block 842 proves that the cadence is not provided with a software flag, that is, both flag select bits are "∅". In this case, the program immediately goes back to the main routine as represented in the flow chart shown in FIG. 9.

It has been described that the test represented by block 838 in FIG. 8 checks the conditions of the two consecutive cadence steps. Two consecutive cadence steps in "off" condition require that the program returns to the first step of a new string of that cadence. Accordingly, in the corresponding location of the resident data memory, the low nibble is set to zero, thereby clearing the step count. Thus, a cadence PROM address is generated pointing to step zero of the respective cadence in the cadence PROM and the high byte of his cadence is moved to the accumulator. These steps are symbolized by block 846 in FIG. 8, and the main routine continues to the step sequence as represented by a flow chart shown in FIG. 9.

Block 910 indicates that the high byte of the cadence which is present in the accumulator is stored in the working register R4. Here, as indicated by m in FIG. 9, the described subroutine represented by block 844 in FIG. 8 returns to the main routine. The present high byte is stored in the resident data memory of the microprocessor. The memory location is specified by the contents of the first working register R0. This is indicated in block 912.

As represented by block 914, the program proceeds to fetch the low byte of the same cadence by decrementing the first working register R0 in order to obtain the resident memory address of the low byte. The contents of the memory location as specified by the second working register point to the corresponding cadence PROM address. By using this address and by presetting bit positions of the second port P2 a cadence memory read operation is initiated and the low byte of the selected cadence step is loaded into the accumulator.

In accordance with block 916 the accumulator contents are stored in the resident data memory by using the address contained in the first working register R0. At this time high byte and low byte of the cadence step are present in the resident data memory. Here, the described subroutine as designated by blocks 828 and 830 in FIG. 8 returns to the main routine. Flag F0 for indicating the "on" condition of the previous cadence step is cleared as represented by block 918. Again, the status information contained in the low nibble of the high byte is transferred to the system RAM banks in the same manner as to be described with respect to the load routine.

The program then proceeds to the subsequent cadence by incrementing the first working register R0 thereby obtaining a corresponding resident data memory address. This address is moved into the accumulator to test if all 16 cadences have been updated, as indicated in block 924. This test is simply performed by means of adding the accumulator contents to immediate data. This adding operation generates a carry only, if the 16th cadence is currently processed. If no carry is produced, the main routine returns to block 818, as indicated by f.

If all cadences are updated, the allocation of the system RAM banks has to be changed by selecting a corresponding output line of the second port P2 individually and by generating an output signal on this line which changes the condition of the toggle flip flop when clocked by the synchronization signal, as described with reference to FIG. 2E. This procedure is indicated in block 926 in FIG. 9. This operation completes the main routine and the program control returns to the wait condition at the starting point, as indicated by g.

Figure 10:
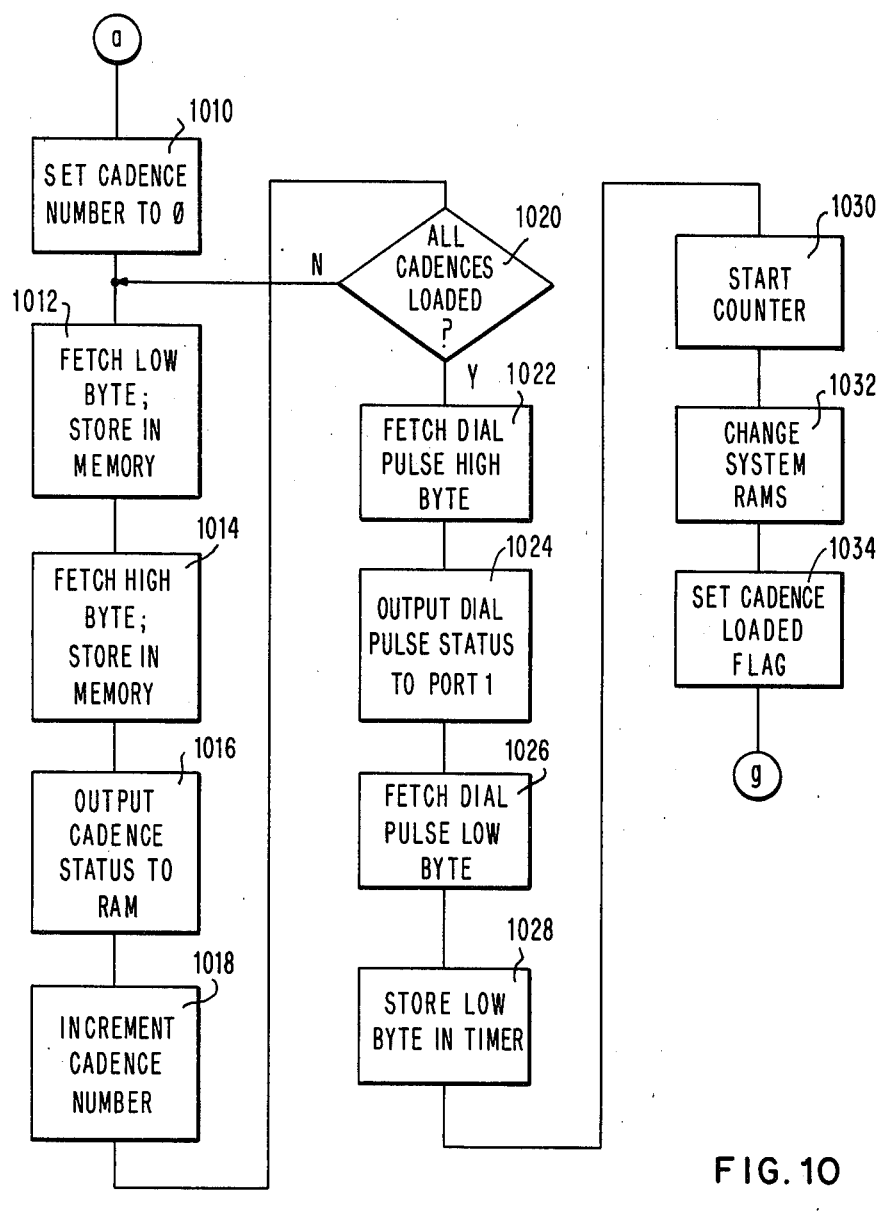
FIG. 10 shows a subroutine of the microprocessor program for loading control information from the external cadence PROM into an internal data memory of the microprocessor.

The Load Routine (FIG. 10)

In the described main routine of the microprocessor program a test, as indicated in block 816, is performed for checking if the resident data memory of the microprocessor is loaded with a respective step of each of the different cadences. The load routine described in the following is the initial routine for the microprocessor. Besides loading of the data of the respective first step of each cadence, the statuses of these candences are transferred to the system RAM bank which is currently associated with the microprocessor.

During the initial load routine the cadence number is set to zero, as shown by block 1010. This is simply achieved by a move instruction loading immediate data into the working register R2 of the microprocessor. This immediate data specifies a first cadence number.

The load routine proceeds to storing of the low byte of the first cadence into the resident data memory. The microprocessor has two 8-bit static I/O ports which can be loaded to and from the accumulator. In addition, individual bits of the I/O ports can be selectively set or reset. This allows to set individual bits of the second port P2 to a condition for selecting an address of the cadence PROM. In the beginning of the load routine, the contents of the accumulator were cleared. If now this contents are moved to one of the working registers of the microprocessor the register will contain a value "∅" which is the remainder of the first PROM address. By the next microprocessor instruction, the contents of the cadence PROM location as specified by the address stored in this working register R1 are moved to the accumulator and the first byte of the cadence PROM is fetched thereby. In the initial steps of the main routine, the first address of the resident data memory of the microprocessor was loaded. The contents of the accumulator are stored at this data memory location which is specified by the first working register R0. This series of steps is reflected by block 1012 in the flow chart.

Similarly, the operation indicated in block 1014 is performed. The address stored in the first working register R0 is incremented by one and points now to the next higher location of the resident data memory. Via the second port P2 of the microprocessor as specified by the contents of the second working register R1 the high byte in the cadence PROM is selected, moved to the accumulator and stored in the resident data memory. Then the contents of the working register R0 again are incremented.

The previous storage operation did not alter the contents of the accumulator and the high byte is still kept there. As described, the accumulator contents can be masked by means of logical AND instructions and OR instructions, ANDing or ORing the contents of the accumulator with immediate data. Such a logical operation is performed for masking the higher nibble of the accumulator contents such that just the three frequency component flags and the enable signal remain in the high byte. These four bits represent the status information of the correpsonding cadence step which is transferred to the associated system RAM bank, as schematically indicated by block 1016. Corresponding to the input instruction described, the microprocessor's output instruction for writing the contents of the accumulator into an external memory location specified by the contents of the working register R1 is used for this transfer.

Now the cadence number in the third working register R2 is loaded into the accumulator. These accumulator contents are exchanged with the contents of the second working register R1. This working register defines an address in the resident data memory for the cadence number in the accumulator. This cadence number is moved to the third working register R2 and incremented. Furthermore, the contents of the second working register R1 are moved into the accumulator and immediate data is added to it for obtaining the next cadence number. This is schematically indicated in the flow chart by block 1018.

The performed adding operation in the accumulator will result in an overflow only, if the last cadence was already the 16th cadence. This overflow of the accumulator causes the setting of the carry bit in the program status word and can be used for a test controlling a conditional jump as indicated in block 1020. If no overflow occurs and the carry bit is zero, then the load routine will return to block 1012. Otherwise, the load routine continues by loading the dial pulse pattern.

This load routine is performed quite similar to loading of cadence steps. With reference to block 1022, again bit positions of the second port P2 are set such that now the second half of the cadence PROM containing the dial pulse pattern is selected and the least significant address bit of the cadence PROM is set to 1 whereby the high bytes of the 16-bit memory locations are designated. The accumulator is cleared, and the second working register R1 and the accumulator exchange their contents. In addition, the contents of the accumulator are moved to the sixth working register R5. The second working register R1 contains now the address of the first dial pulse step, and in conjunction with the preset bits of the second port P2, a cadence PROM location is selected which contains the first dial pulse high byte. This byte is moved into the accumulator and is transferred into a further working register R7 leaving the contents of the accumulator unaltered.

According to block 1024, the accumulator contents are masked such that the higher nibble of the high byte is set to zero. The accumulator thus contains just the dial pulse status information which is given out via the first port P1 of the microprocessor to the group processor of the switch.

The load routine for the dial pulse pattern continues now to fetch the dial pulse low byte, as represented by block 1026. Bit positions of the second port P2 of the microprocessor are masked such that in conjunction with the contents of the second working register R1, the address of this low byte in the cadence PROM is generated. This low byte containing the entire code for the time constant is transferred via the accumulator to the timer of the microprocessor, as evident from block 1028. The contents of the second working register R1 of the microprocessor are incremented for obtaining the address of the next dial pulse entry and moved to the accumulator. The accumulator and the further working register R5 of the microprocessor exchange their contents. Thus, the address of the next following entry of a dial pulse pattern is stored in the working register R5.

In the next step of the load routine, as indicated in block 1030, the counter of the microprocessor is started. This counter is incremented by each high-to-low transition at test pin T1 of the microprocessor. Such transitions occur whenever the interrupt signal synchronizing the operation of the microprocessor is received.

At this time, all currently needed data has been transferred from the cadence PROM into the resident data memory, and the respective status information with respect to all cadences and the dial pulse pattern has been given out either to a system RAM bank or the group processor. Now the allocation of the system RAM banks to the microprocessor system has to be changed, as indicated in block 1032. This change is performed by means of the operation of the toggle flip flop as described with reference to FIG. 2E. The corresponding control signal is generated by setting a single bit position of the second port P2 of the microprocessor. The output signal of the toggle flip flop can also be used for indicating the "cadence loaded" condition to serve as a flag passed to test pin T0 of the microprocessor indicating that the data memory is loaded.

The status of the second port P2 is cleared by a last logical instruction of the load routine which is inverse to the previously described selecting operation of a single bit position of the second port P2. At this time the load routine is completed and the program jumps back to the main routine as indicated by g.

Figure 11:
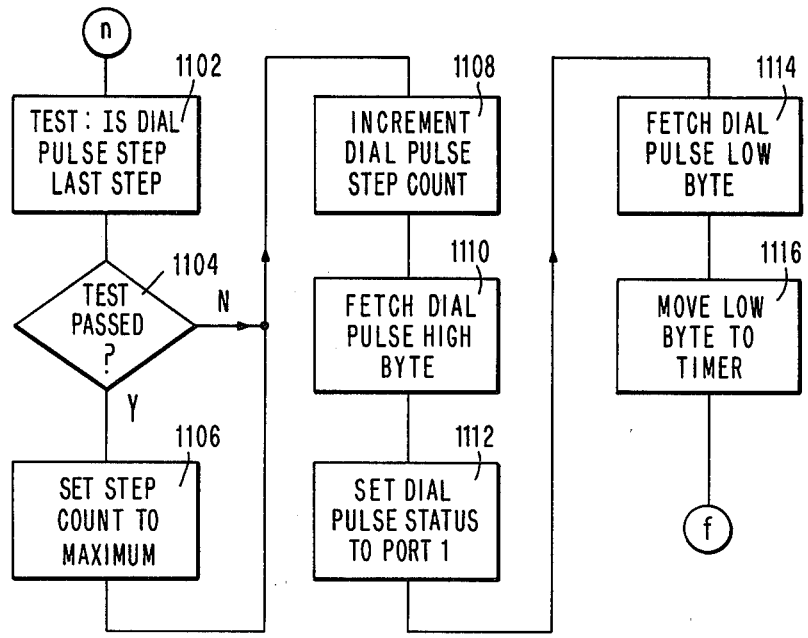
FIG. 11 shows a flow chart of a subroutine of the microprocessor system describing the updating of dial pulses.

Dial Pulse Update (FIG. 11)

A further subroutine of the microprocessor program has been bypassed while describing the main routine. This subroutine refers to updating the dial pulse pattern after expiration of the timer according to block 818 in FIG. 8. During each run of the main routine, it is tested whether the dial pulse time has expired. As soon as this becomes true, control is passed to the dial pulse update routine as indicated by n. This routine is represented by the flow chart shown in FIG. 11.

The dial pulse routine starts by testing if the currently loaded dial pulse step is the last step in a string, as indicated by block 1102. For performing this test the contents of the eighth working register R7 of the microprocessor system are moved into the accumulator. It may be recalled from the description of the load routine, that this working register R7 has been loaded with the high byte of the dial pulse pattern. If this byte is associated with the last dial pulse step, its most significant bit position LS will contain a "1", as explained with reference to the layout of the dial pulse pattern in FIG. 7. The accumulator contents are added to immediate data comprising a "1" in the most significant position, thereby generating an accumulator carry in case of the last step. The status of the carry bit in the program status word, therefore, determines if the last step is reached. The test is passed, when the carry bit is set and the program continues with block 1106 in accordance with the branch indicated in block 1104.

During processing of the dial pulse pattern, the sixth working register R5 of the microprocessor is reserved for storing the step count of the dial pulse pattern. This step count is now set to its maximum count by entering into the sixth working register a data word comprising "1" in each bit position. The design of this step is such that the program control can directly proceed to the next block 1108 wherein the contents of the sixth working register R5 containing the step count are incremented. This leads automatically to the first dial pulse step.

The same instruction is performed when the test indicated in block 1104 is not passed. In this case by incrementing the contents of the sixth working register R5, the next step count is obtained.

Block 1110 again necessitates a read operation of the cadence PROM. For selecting the proper area of the cadence PROM and within that area the high byte respective bit positions of the second port P2 of the microprocessor are preset individually. The contents of the sixth working register R5 and the second working register R1 are exchanged. Thus, the second working register R1 now contains the address of the resident data memory pointing to the respective memory location of the cadence PROM. The read operation is performed in accordance with previous detailed description. The high byte of the currently processed dial pulse step is transferred via the accumulator to the eighth working register R7. The unaltered contents of the accumulator are masked such that the high nibble is masked and the status information comprising the four less significant bits is obtained. As indicated by block 1112, this status information is given out to the group processor via the first port P1 in the same manner as previously described in detail.

In accordance with the current indirect address contained in the second register R1 and the proper setting of the individual bit positions of the second port P2 the corresponding low byte of the dial pulse step is read out from the cadence PROM and moved into the accumulator as indicated in block 1114. The contents of the accumulator are transferred into the timer of the microprocessor thereby setting the timer to an initial count, as evident from block 1116. The contents of both the sixth working register R5 and the second working register R1 are exchanged again, thus reversing the previously described exchange operation and reconstructing the respective register contents. The dial pulse update routine is completed and processing is continued with block 818 (FIG. 8) of the main routine, as indicated by f.

Figure 12:
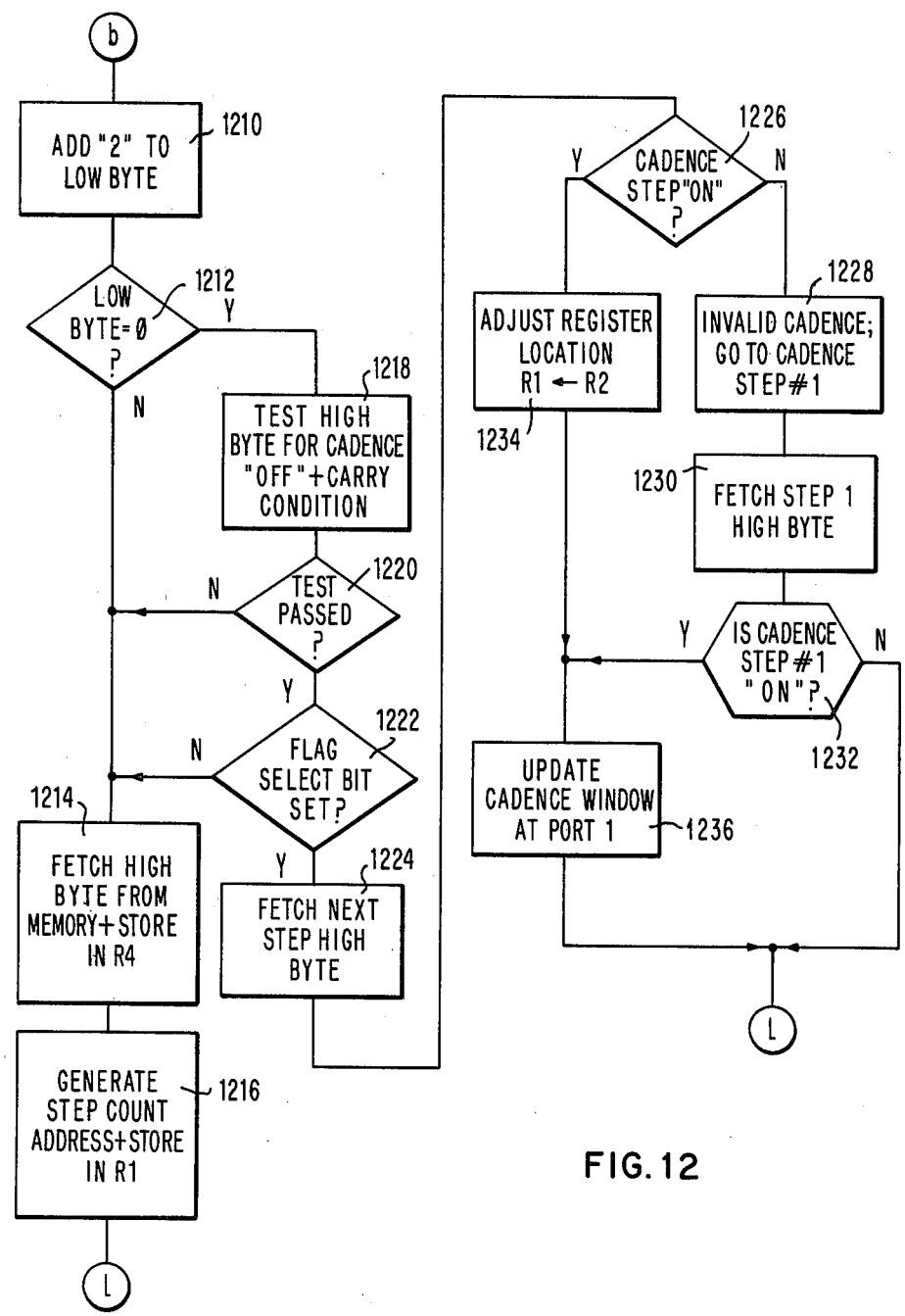
FIG. 12 shows a flow chart of a further subroutine of the microprocessor program comprising a flag change check for updating of control signals generated by the microprocessor and passed to control units of an exchange switch for synchronizing operation of the digital tone generator with those centrally located units.

Flag Change Check (FIG. 12)

During the description of the main routine the test represented by block 822 has been mentioned. If this test is failed, the program initializes a further subroutine as indicated by b. This subroutine checks whether a change of the software flags being sent to the group processor and signalling the current condition of the respective cadence becomes necessary.

The routine changes the software flag, if the cadence is currently in "off" condition and will be going to "on" condition. It has to be taken into consideration that the group processor software will respond to the software flag transition corresponding to a change in the condition of the cadence with some delay. The software flag intended for indicating the active or inactive state of a cadence, therefore, has to be generated prior to an actual change of the cadence condition such that the software of the group processor can catch up with this situation despite the delayed response. The chosen guard time is 8 ms which corresponds to two count times of the cadence time pattern. The objective of the subroutine therefore is to evaluate each cadence having currently a cadence step in "off" condition whether this condition two count times later will be changed.

This subroutine "Flag Change Check" is represented in detail by the flow chart shown in FIG. 12. The routine starts as indicated in block 1210 by adding "two" to the low byte of the currently processed cadence step. This is simply achieved by adding immediate data containing this value to the contents of the accumulator and creating an overflow when the count time expires. This overflow can be recognized by testing the status of the carry bit in the program status word. This carry bit test is indicated in block 1212. It fails, if the low byte is not zero and indicates thereby that the condition of the cadence will not change within the guard time of 8 ms. The program continues with the C-routine as designated by blocks 1214 and 1216. If compared to blocks 828 and 830 in FIG. 8, it will be evident that this sequence of steps has already been described with reference to the course of the main routine. This branch of the subroutine indicates that no flag change has to be taken into consideration in the given situation.

However, passing of the test performed according to block 1212 is a first indication of a probable flag change. The program then continues to test the condition of the currently processed cadence, as shown in block 1218. It may be recalled that this type of test also is performed within the main routine as evident from block 832 in FIG. 8. Again, the enable bit of the high byte is checked. The only difference is that here the "off" condition is tested. If the new cadence step still is in "on" condition, no flag change is necessary, and as symbolized by block 1220 control is passed to the C-routine represented by blocks 1214 and 1216.

Similar to the test symbolized by block 842 in FIG. 8, in accordance with block 1222, it has now to be checked, if the flag select bits are set. Again, if none of the flag being select bit positions is set to "1" in the high byte of the cadence step, control is passed to the C-routine.

But if also this test is passed, the program continues to block 1224 representing a sequence of operations which is similar to those described with reference to block 836 of FIG. 8, and moving the high byte into the accumulator. Further detailed description therefore is deemed not to be necessary.

The next following test, indicated in block 1226, checks the status of the enable bit in the new high byte to determine whether this cadence step is in "on" condition. Such a test has been described in detail previously with reference to block 838 of FIG. 8. If the cadence is still in "off" condition, we have two consecutive cadence steps in "off" condition, which is normally not allowed by system requirements. Therefore, the fetched and tested cadence step is invalid and the program must go to step $\emptyset$, as shown in block 1228. This is simply achieved by resetting the low nibble of the second working register R1 to $\emptyset$.

By means of this corrected address a read operation from the cadence PROM is performed to fetch the respective high byte of cadence step $\emptyset$ as indicated in block 1230. According to block 1232 again the enable bit of this cadence step is evaluated for testing the condition of cadence step $\emptyset$, as shown in block 1232. If this test fails no software flags being sent to the group processor of the switch have to be changed and the program returns to the output section of the main routine as indicated by l.

Either one of the last two tests shown in blocks 1226 and 1232 is passed when the respective cadence step is in "on" condition. In both cases, a situation has arisen when the previous cadence step was in "off" condition and a change of condition occurs with the second subsequent cadence step. In both cases, an update of the cadence window, that is the software flag sent to the group processor is necessary.

After a test represented by block 1226, the cadence window updataing still cannot be performed immediately. The reason is that the complete current step address has been temporarily moved to the third working register R2, whereas register R1 contains the next step address. As indicated in block 1234, these register locations are adjusted by moving the contents of the third working register R2 into the second working register R1.

The final sequence of steps of the currently described subroutine is represented by block 1236. The high byte of the cadence step which initiated this subroutine has been loaded into the fifth working register R4 and is therefore still available. It is moved back to the accumulator for performing a masking operation of the flag select bits. As previously described with respect to block 844 in FIG. 8, updating of the cadence window is performed in a similar sequence of steps, thus a detailed description is deemed not to be necessary. After generating the software flag and setting a respective bit position of port P1 of the microprocessor, the subroutine is completed and the program returns to the output section of the main routine, as indicated by 1.

Figure 13:
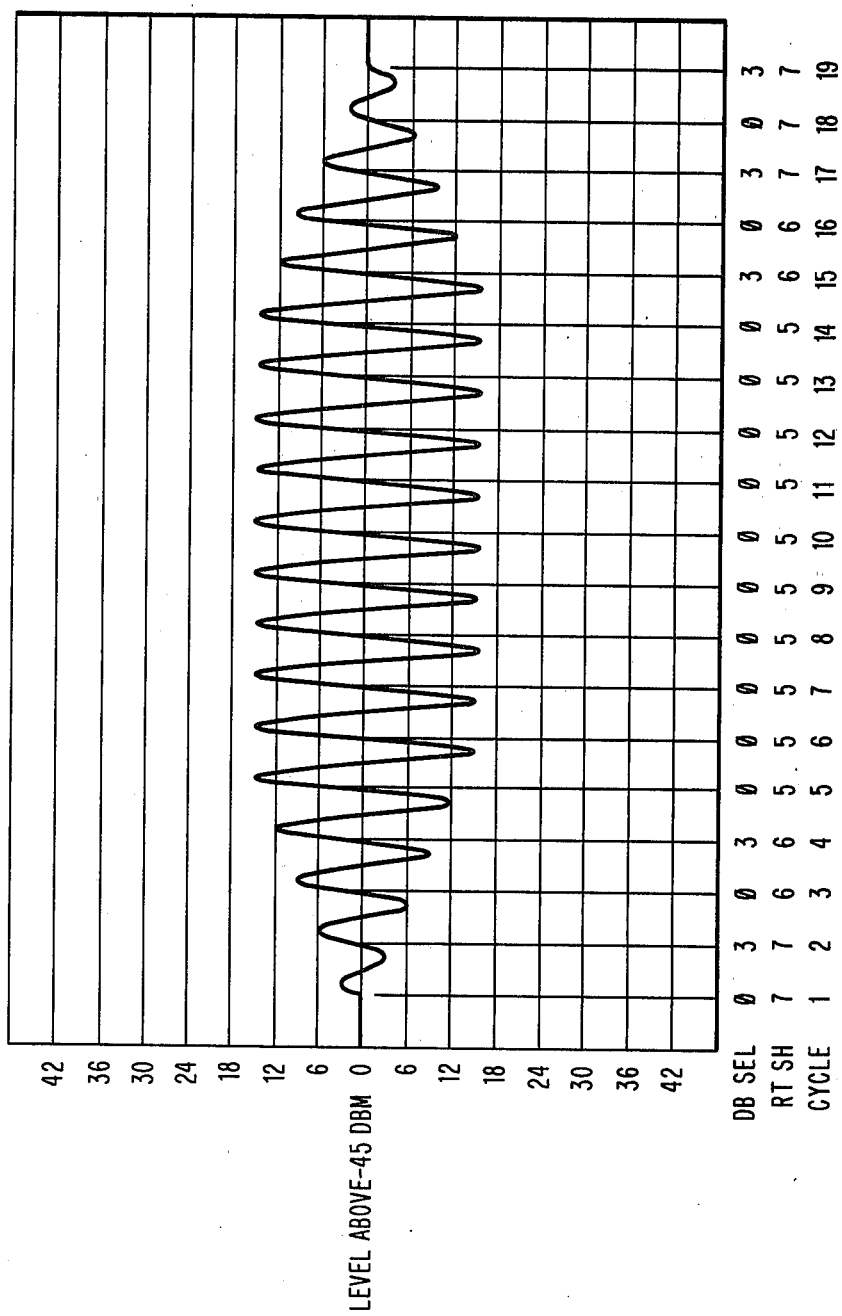
FIG. 13 shows a timing diagram representing an example of a cadence in "on" condition including periods of ramp up and ramp down modulation.

The Gain Control Unit (FIGS. 2F and 13)

With respect to the cadence control unit represented in FIG. 2E, it has been described how the status information for each cadence is generated and how it is intermediately stored in one of the system RAM banks 274 and 275, respectively. It has also been explained that the system RAM banks are alternately associated with the microprocessor system 272 for receiving an update of the status information while the system RAM bank currently not occupied by the microprocessor system furnishes such status information to the remainder of the tone generator, addressed by output signals of the cadence select PROM 271. Thus, the synchronized operation with the related sub-units is achieved by means of the frequency address present at the FA-BUS.

The gain control unit represented in FIG. 2F receives such status information and controls above all the ramp-up/down modulation of the cadences. It receives, in addition, a part of the address passed to the sine generator, that is the sign bit and the ∅, 3 db initiate signal. Further control information received concerns the number of right shift steps determining the final hold level of each cadence which is supplied by the cadence select PROM 271. By means of this input information control signals are generated and sent out to the sine generator 13 and the right shift logic 14, both represented in FIG. 2C. This control information refers to an idle code control signal, a ∅, 3 db select signal and a binary encoded shift number specifying the current number of right shift steps to be performed by the right shift logic 14. The last two items of control information determine in combination the corresponding levels of amplitude values varying in 3 db steps. It may be recalled that the ramping modulation of a cadence going from "off" to "on" condition or vice-versa has to be performed such that the tones put out onto the PCM highway A or B have a tone modulation envelope with 3 db steps. Each frequency component of a digital tone is modulated individually.

The main device for generating the control information in the gain control control unit is a ramp PROM 281 which can be composed of any commercially available 1024×6-bit PROM chip. Each of its entries is associated with a specific control condition to be evaluated by the gain control unit. Each condition is specified by input signals forming, in combination an address for a corresponding entry. A part of the address information passed to the ramp PROM 281 comprises the ∅, 3 db initiate signal, the sign bit and the number of right shift steps at the hold level of a cadence furnished by the cadence select PROM 271. Further address information passed to the ramp PROM 281 is generated by two other devices of the gain control unit. One of these devices is a 256×5-bit RAM 282. It receives the complete frequency address carried along the frequency address but FA-BUS for selecting one of the 256 memory locations. This RAM stores a part of the output information of the ramp PROM 281, including the sign bit, the ∅, 3 db select code and the binary encoded shift number and stores this information intermediately for one cycle. During the next cycle the same information is read out to the ramp PROM 281 as a further part of the address information.

The third device of the gain control unit is a 3-line-to-1-line data selector 283. This device receives the status information from the currently associated system RAM bank 274 or 275 as data information and the two least significant bits FA0, FA1 of the frequency address for selecting a respective one of the frequency flag bits of the status information to be put out as frequency modulation signal $F_n$-MOD and carried to the ramp PROM 281 for completing its address information. The fourth bit of the status information, the enable bit is used as a control signal for activating and de-activating the selector device 283 in dependence upon its current condition. The selector device 283 can be composed of any one of a variety of commercially available selector devices.

As evident from the described structure of the gain control unit, its operation is synchronized with those of the surrounding devices of the digital tone generator by means of the frequency address carried along the frequency address bus FA-BUS. Based upon this frequency address the corresponding cadence is selected in the cadence select PROM 271 for obtaining the corresponding status information read out from the system RAM bank 274 or 275, and the ramp RAM 282 is addressed to complete the ramp PROM address together with the binary encoded number of right shift steps determining the hold level and received from the cadence select PROM and the current condition of the sign bit. This control information is presented at the ramp PROM 281 at a time prior to generating the corresponding sine wave amplitude value, since the output information of the PROM is used to control generating of the instantaneous sine amplitude value.

In receiving control information referring to the current cycle and the previous cycle the ramp PROM 281, by programming, is enabled to evaluate changes of signal conditions and to generate, based upon such evaluation, the corresponding output control information. The main object is to realize in advance when the amplitude value of each frequency component of a cadence will cross the zero level from the negative half wave to the positive half wave. During the ramp-up modulation at this time a 3 db increase of the amplitude value as compared to the previous sine period has to be initiated. It has been described in detail with respect to the operations of the sine generator 22 and the right logic 14 that an increase or decrease of sine amplitude values can be performed in 3 db steps by selecting, in combination, an appropriate number of right shift steps to be performed by the right shift logic 14 and one of the two sine tables of the sine wave generator 13. It may be noted that ramp-up modulation always starts from the "off" condition of a cadence. This "off" condition, for better determination, is associated with a specific idle channel code rather than the binary encoded zero value. The idle channel code can be specifically designed according to system requirements. It may be the value of the lowest speech level in combination with a negative sign bit which would result in a code comprising zeros following a "1". Also a scrambled code could be used for achieving a specific code pattern quite different from all bit patterns of useful digital encoded information. The specific design of the idle channel code is not of importance rather than its use at all.

From the foregoing it is evident that the combinations of the current sign bit and the sign bit of the previous operating cycle can be used to evaluate whether a zero crossing of a frequency component going from negative to positive sine values will occur. The contents of the ramp PROM 281 are now designed such that only in case of a combination with the previous sign bit being negative and the current sign bit being positive an adjustment of the output control information of the ramp PROM 281 concerning the number of shift steps and/or the $\emptyset$, 3 db select bit is made. This increase in 3 db steps will occur individually for each frequency component of the cadence until finally the hold level of the cadence is reached. This hold level is determined by the number of right shift steps obtained from the cadence select PROM 271. It is obvious that the ramp up modulation is variable in time, since this time span is frequency dependent and, in addition, also dependent upon the final hold level of the cadence. The ramp down modulation has the same operation characteristics except for a decrease of 3 db whenever a zero crossing from negative to positive sine values occurs.

The ramp down modulation is completed as soon as the signal reaches the theoretical "zero" value, that is, the lowest speech level of −45 dbm which is to be operated by the system.

A more detailed understanding of the operation of the ramp PROM 281 may be had from a description of a specific example showing the generation of a tone modulation envelope rather than by presenting a detailed layout description of the ramp PROM itself. Such an example will now be described with reference to Tables

TABLE 5A

| | RAMP PROM ADDRESS INPUTS | | | | | | | RAMP PROM OUTPUTS | | | |
|---|---|---|---|---|---|---|---|---|---|---|---|
| CYCLE | RT. SH. (ON) | DB. INIT. (ON) | $F_n$ MOD. | SIGN (T) | SIGN (T − 1) | RT. SH. (T − 1) | DB. SEL. (T − 1) | DB. SEL. (T) | RT. SH. (T) | OFF (IDLE) | COMMENT |
| 0,19 | 5 | 0 | 0 | X | X | X | X | 0 | 7 | 1 | (1) |
| 0,19 | 5 | 0 | 1 | + | + | 7 | 0 | 0 | 7 | 1 | ⎫ |
| 0,19 | 5 | 0 | 1 | − | + | 7 | 0 | 0 | 7 | 1 | ⎬ (2) |
| 0,19 | 5 | 0 | 1 | − | − | 7 | 0 | 0 | 7 | 1 | ⎭ |
| 1 | 5 | 0 | 1 | + | − | 7 | 0 | 0 | 7 | 0 | (3) |
| 1 | 5 | 0 | 1 | + | + | 7 | 0 | 0 | 7 | 0 | ⎫ |
| 1 | 5 | 0 | 1 | − | + | 7 | 0 | 0 | 7 | 0 | ⎬ (4) |
| 1 | 5 | 0 | 1 | − | − | 7 | 0 | 0 | 7 | 0 | ⎭ |
| 2 | 5 | 0 | 1 | + | − | 7 | 0 | +3 | 7 | 0 | (3) |
| 2 | 5 | 0 | 1 | + | + | 7 | +3 | +3 | 7 | 0 | ⎫ |
| 2 | 5 | 0 | 1 | − | + | 7 | +3 | +3 | 7 | 0 | ⎬ (4) |
| 2 | 5 | 0 | 1 | − | − | 7 | +3 | +3 | 7 | 0 | ⎭ |
| 3 | 5 | 0 | 1 | + | − | 7 | +3 | 0 | 6 | 0 | (3) |
| 3 | 5 | 0 | 1 | + | + | 6 | 0 | 0 | 6 | 0 | ⎫ |
| 3 | 5 | 0 | 1 | − | + | 6 | 0 | 0 | 6 | 0 | ⎬ (4) |
| 3 | 5 | 0 | 1 | − | − | 6 | 0 | 0 | 6 | 0 | ⎭ |
| 4 | 5 | 0 | 1 | + | − | 6 | 0 | +3 | 6 | 0 | (3) |
| 4 | 5 | 0 | 1 | + | + | 6 | +3 | +3 | 6 | 0 | ⎫ |
| 4 | 5 | 0 | 1 | − | + | 6 | +3 | +3 | 6 | 0 | ⎬ (4) |
| 4 | 5 | 0 | 1 | − | − | 6 | +3 | +3 | 6 | 0 | ⎭ |
| 5–14 | 5 | 0 | 1 | + | − | 6 | +3 | 0 | 5 | 0 | (5), (6) |

TABLE 5B

| | RAMP PROM ADDRESS INPUTS | | | | | | | RAMP PROM OUTPUTS | | | |
|---|---|---|---|---|---|---|---|---|---|---|---|
| CYCLE | RT. SH. (ON) | DB. INIT. (ON) | $F_n$ MOD. | SIGN (T) | SIGN (T − 1) | RT. SH. (T − 1) | DB. SEL. (T − 1) | DB. SEL. (T) | RT. SH. (T) | OFF (IDLE) | COMMENT |
| 5–14 | 5 | 0 | X | + | + | 5 | 0 | 0 | 5 | 0 | ⎫ |
| 5–14 | 5 | 0 | X | − | + | 5 | 0 | 0 | 5 | 0 | ⎬ (7) |
| 5–14 | 5 | 0 | X | − | − | 5 | 0 | 0 | 5 | 0 | ⎭ |
| 15 | 5 | 0 | 0 | + | − | 5 | 0 | +3 | 6 | 0 | (8) |
| 15 | 5 | 0 | 0 | + | + | 6 | +3 | +3 | 6 | 0 | ⎫ |
| 15 | 5 | 0 | 0 | − | + | 6 | +3 | +3 | 6 | 0 | ⎬ (4) |
| 15 | 5 | 0 | 0 | − | − | 6 | +3 | +3 | 6 | 0 | ⎭ |
| 16 | 5 | 0 | 0 | + | − | 6 | +3 | 0 | 6 | 0 | (3) |
| 16 | 5 | 0 | 0 | + | + | 6 | 0 | 0 | 6 | 0 | ⎫ |
| 16 | 5 | 0 | 0 | − | + | 6 | 0 | 0 | 6 | 0 | ⎬ (4) |
| 16 | 5 | 0 | 0 | − | − | 6 | 0 | 0 | 6 | 0 | ⎭ |
| 17 | 5 | 0 | 0 | + | − | 6 | 0 | +3 | 7 | 0 | (3) |
| 17 | 5 | 0 | 0 | + | + | 7 | +3 | +3 | 7 | 0 | ⎫ |
| 17 | 5 | 0 | 0 | − | + | 7 | +3 | +3 | 7 | 0 | ⎬ (4) |
| 17 | 5 | 0 | 0 | − | − | 7 | +3 | +3 | 7 | 0 | ⎭ |
| 18 | 5 | 0 | 0 | + | − | 7 | +3 | 0 | 7 | 0 | (3) |
| 18 | 5 | 0 | 0 | + | + | 7 | 0 | 0 | 7 | 0 | ⎫ |
| 18 | 5 | 0 | 0 | − | + | 7 | 0 | 0 | 7 | 0 | ⎬ (4) |
| 18 | 5 | 0 | 0 | − | − | 7 | 0 | 0 | 7 | 0 | ⎭ |

5A, 5B and FIG. 13 showing in form of a timing diagram the modulation envelope of a tone for simplification consisting of only one frequency component. The axis of the time diagram shows in form of a legend reference cycles 0 through 19, each of which cycles corresponds to a full sine period of the represented tone. In addition, the corresponding condition of the ∅, 3 db select bit and the number of right shift steps is indicated for each reference cycle. The relative zero value of the y-axis is referred to the lowest speech level of −45 dbm.

The Tables 5A, 5B describe in consecutive lines the varying input and output conditions of the ramp PROM which occur during the course of generating the tone modulation envelope shown in FIG. 13. The layout of Tables 5A and 5B is identical and the labelling corresponds to that of FIGS. 2F and 13, respectively. The first column designates the corresponding reference cycle. The next four columns refer to address information of the ramp PROM 281 comprising information associated with the current operation cycle of the digital tone generator which cycle is reference by T. The following three columns are related to the part of the address information of the ramp PROM 281 which is read out from RAM 282. Accordingly, this information is associated with the previous operating cycle of the digital tone generator, which is referenced by (T-1). The contents of three more columns refer to output signals of the ramp PROM 281 except for the sign bit which is identical with the input signal SIGN (T). Obviously a binary equivalent of decimal numbers is used in a real PROM and symbols "+" and "−" of the sign bits are encoded "∅" and "1", respectively. The ∅, 3 db select bit when selecting the ∅ db table of the sine generator is in state "∅", and accordingly in the opposite state when the +3 db table is to be selected. The modulation signal $F_n$-MOD corresponds to "1" in "on" condition and accordingly to "∅" in "off" condition of the corresponding frequency flag bit of the status information. The last column refers to the comments which will be made in the following.

As referenced by comment (1), the first line of Table 5A reflects an initial condition corresponding to reference cycles 0, 19 when the cadence is in "off" condition, determined by the enable bit in "off" state. For this reason, the conditions of the sign bits, the shift number and the ∅, 3 db initiate signal, as well, are disregarded. The output information comprises the idle channel code indicating the "off" condition of the cadence and a combination of ∅, 3 db select signal and the right shift number which points to the lowest speech level.

As indicated by reference comment (2), the next three lines reflect conditions when the modulation signal $F_n$-MOD is "on" and various conditions of the sign bits occur prior to the first significant zero crossing when the sign bit goes from "−" to "+" after the modulation has been turned on.

The first significant zero crossing occurs in the next line referenced by comment (3). The conditions of the sign bits show that the sign bit changes its state from the previous operating cycle to the current operating cycle of the digital tone generator. This results in the resetting of the idle channel code to "∅" condition. A change of neither the ∅, 3 db select bit nor the shift number is necessary at the time of the first significant zero crossing.

The following three lines referenced by comment (4) complete the illustration of reference cycle 1 covering a complete sine wave. Various combinations of the sign bits occur without any consequence on the output signals of the ramp PROM 281.

At the beginning of reference cycle 2 the next significant zero crossing occurs. The respective line of Table 5A is referenced by comment (3). This time the first 3 db increase is obvious from the change of the ∅, 3 db select bit as evident from a comparison of the respective bit conditions of the current operating cycle and the previous operating cycle of the digital tone generator.

The remaining three lines also refer to reference cycle 2 showing various combinations of the sign bits without any change of the mean level of the sime amplitude value, as indicated by comment (4). At the beginning of reference cycle 3 the next significant zero crossing occurs, again referenced by comment (3). At this time, the number of right shift steps is reduced by one from 7 to 6 which is identical to a 6 db increase of the mean value. Coincidentally, the ∅, 3 db select bit changes its condition from "on" to "off" which results finally again in a 3 db increase of the mean value.

Similar adjustments of the shift numbers and the ∅, 3 db select bits are made during reference cycles 3 and 4. The last line of Table 5A, referenced by comments (5) and (6), represents the adjustment for the last significant zero crossing during the ramp up modulation. At the beginning of this fifth reference cycle the generated tone reaches its final hold level. The hold level is determined by the number of right shift steps generated by the cadence select PROM 271. As soon as the shift number given out by the ramp PROM 281 is identical to this number the ramp modulation is completed. Therefore, no further changes of the output signals of the ramp PROM 281 are generated during reference cycles 5 through 14, as indicated by the first three lines of Table 5B and referenced by comment (7). It may be mentioned that neither the time span needed for completing the ramp up modulation nor the number of reference cycles at hold level are common characteristics to all cadences. The number of respective cycles may vary with respect to each cadence and Tables 5A, 5B and the corresponding modulation envelope shown in FIG. 13 represent just one possible example.

At the beginning of reference cycle 15 of the chosen example, two conditions coincide. Firstly there is another zero crossing and secondly the modulation signal is reset to "∅". This zero crossing is the first "−" to "+" zero crossing after the modulation signal $F_n$-MOD has been reset. At this time the ramp down modulation is started which is referenced by comment (8). During ramp down modulation the right shift number and the condition of the ∅, 3 db select bit are changed in combination such that at each significant zero crossing a 3 db decrease of the mean level of the signal is achieved. The operation of the gain control unit as determined by the contents of the ramp PROM 281 during reference cycles 16 through 18 is obvious in view of the foregoing detailed description, see corresponding comments (3) and (4) above. The corresponding conditions are the same except for the difference that the mean value of the sine wave period is decreased by 3 db steps during the ramp down modulation.

Evidently the operation of the gain control unit mainly is controlled by the contents of the ramp PROM 281. The described functions of the ramp PROM 281 disclose the layout of the PROM in itself to an extent which enables anyone skilled in the art to program the ramp PROM chip in accordance with the teaching of the present invention. It is, therefore, deemed not to be necessary to describe such layout in more detail. The ramp PROM 281 simply comprises a function generator based upon respective memory entries which are selected by a respective bit combination of the input control signals at the various outputs. These output signals are applied to the sine generator 13 and the right shift logic 14 for controlling the operation of these devices in a manner described.

There has thus been shown and described a novel digital tone generator which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A digital tone generator adapted to be connected to a digital telecommunication system for simultaneously generating during a tone generator operation cycle digital encoded instantaneous amplitude values of a variety of continuous and of cyclically repeated discontinuous tone signals each composed of at least one frequency component and assigned to a separate tone channel of a tone highway representing a time-division multiplexed serial data transmission line, said digital tone generator comprising:

(a) sequencing control means for generating a consecutively incremented and cyclically repeated reference address signal directing the course of said operating cycle;

(b) amplitude control means for generating amplitude control signals determining varying mean amplitude values of discontinuous digital tone signals such that stepwise adjusting of a mean amplitude value takes place coincidentally with the instantaneous amplitude going through zero value and in accordance with a predetermined attenuation curve at the commencement of the rising and trailing ends of a pulse of each discontinuous digital tone signal, said amplitude control means including at least one input connected to receive said reference address signal, storage means for storing steady and variable amplitude control information, processing means for producing said amplitude control signals, and at least one input;

(c) amplitude value generating means including a phase value generator connected to receive said reference signal for producing an instantaneous, frequency dependent phase value signal constituting a current sine address signal; and including a single sine wave generator incorporating a sine wave memory in form of a random access memory provided with a multiplicity of memory locations each permanently storing one of consecutive sine amplitude values having a finite difference from each other such that these values represent a continuous part of a single sine wave form, said memory for storing sine wave amplitude values having address inputs connected to receive the sine address signal and read outputs wherein said amplitude value generating means are further connected to receive said amplitude control signals for generating a digital encoded signal representing one of said instantaneous amplitude values; and (d) output means connected to receive said digital encoded signals for transmitting said digital encoded signal onto said tone highway in synchronization with the cyclical occurrence of the assigned tone channel.

2. The digital tone generator as recited in claim 1, further comprising:

a first unidirectional bus connecting said sequencing unit to said amplitude control means and said amplitude value generating means for transmitting all bits of said reference address signal in parallel.

3. The digital tone generator as recited in claim 1, wherein the sequencing control means further comprises:

a clock generator composed of a frequency dividing binary counter arrangement having a clock input for receiving an external master clock signal, a reset input for receiving a main synchronization signal and a plurality of parallel outputs for high frequency and low frequency pulse trains; said outputs for low frequency pulse trains furnishing in parallel all bits of said reference address signal at a time, wherein the least significant bits of said reference address signal determine in combination consecutive reference addresses each associated with a respective one of said frequency components of a tone signal; and a steering signal generator connected to receive in parallel the high frequency pulse trains including said least significant bits of the reference address signal, said steering signal generator including a storage arrangement being cyclically addressed for reading operations by means of the received clock generator output signals and having parallel outputs supplying steering signals controlling the synchronized step-by-step operation of the digital tone generator for generating said digital encoded signals.

4. The digital tone generator as recited in claim 1, wherein said amplitude value generating means further comprise:

an attenuating unit connected to the read outputs of the sine wave generator and connected to receive the amplitude control signals and being adjustable to attenuate a received sine amplitude value into an attenuated sine amplitude signal, wherein the attenuation rate is determined in accordance with the present amplitude control signals; and a processing circuitry network connected to receive said attenuated sine amplitude signal for generating the corresponding digital encoded instantaneous amplitude value by summing consecutive attenuated sine wave amplitude signals each corresponding to a different frequency component of one of said tone signals.

5. The digital tone generator as recited in claim 4, wherein said phase value generator comprises:

a read-only phase constant memory having address inputs connected to receive the reference frequency address, data outputs, and memory locations each storing an individual frequency dependent phase constant determined to define a relative address difference for the sine wave memory and corresponding to a respective frequency component of one of said tone signals;

a randomly accessible phase value memory for intermediately storing current phase values each corresponding to a respective bit combination of the reference address signal, said phase value memory having address inputs connected to receive the reference address signal, data inputs and data outputs; and said data outputs of said phase constant memory and of said phase value memory being connected to said inputs of said processing circuitry network enabling summing of simultaneously occurring respective memory output signals to generate a subsequent phase value signal furnished to the sine wave generator and stored back into the phase value memory.

6. The digital tone generator as recited in claim 4, wherein said sine wave generator further comprises:

an address buffer having parallel inputs connected to receive said phase value signal, parallel outputs connected to said address inputs of said sine wave memory and a control input connected to receive a respective one of said steering signals for synchronizing address select and read operations of the sine wave memory with the time frame of the digital tone generator.

7. The digital tone generator as recited in claim 6, wherein the phase value signal is composed of (n=2) bits with n bits forming an address of the sine wave generator memory and two most significant bits representing a sign bit and a quadrant bit, respectively, and wherein the sine wave generator further comprises:

a multiple exclusive-OR circuit having n circuits each associated with a respective one of n less significant bits of the phase value signal; each exclusive OR circuit having a first input connected to receive a respective bit of the phase value signal, a second input connected to receive the quadrant bit and an output connected to a respective one of the parallel inputs of the address buffer for storing a sine address signal; and a read only memory forming said sine wave memory and being composed of memory locations storing sine wave amplitude values for just one quadrant of the sine wave form.

8. The digital tone generator as recited in claim 7, wherein the read only memory of the sine wave generator further comprises:

two memory areas each storing an alternatively selectable table of sine amplitude values representing one quadrant of a sine wave form but differing from each other by 3 db; and a further address input for selecting a respective one of said memory areas and connected to receive one of said amplitude control signals forming a table select signal, whereby in combination with the operation of said attenuating unit attenuated sine amplitude values differing from each other in 3 db steps can be obtained.

9. The digital tone generator as recited in claim 8, wherein the attenuating unit is a shift logic unit composed of shift matrices for performing a selectable number of shift operations on a received sine amplitude value under control of said amplitude control signals representing a shift step number code.

10. The digital tone generator as recited in claim 9, wherein the processing circuitry network comprises:

an arithmetical unit having a first set of parallel inputs for receiving a first operand, a second set of parallel inputs for receiving a second operand and a set of parallel outputs; and first, second and third buffer registers each having parallel inputs and outputs, said first buffer registers each connected to receive the attenuated sine amplitude value associated with a respective one of the frequency components of the same tone signal and having outputs connected to a respective one of the sets of parallel inputs of the arithmetic logical unit;

said second buffer register connected by its inputs to the outputs of the arithmetic logical unit and by its outputs to one set of inputs of the arithmetic logical unit for buffering an intermediate result of a summing operation of attenuated sine amplitude values associated with different frequency components of the same tone signal; and said third buffer register connected by its inputs to the outputs of the arithmetic logical unit for storing the digital encoded instantaneous amplitude value representing the final result of the summing operations with respect to all different frequency components of the same tone signal.

11. The digital tone generator as recited in claim 10, wherein the means for consecutively generating amplitude control signals with respect to predetermined cadence patterns designating a cyclically repeated timing pattern of a discontinuous tone specifying changes in mean amplitude, frequency combination as a function of time comprises:

a cadence select memory having data outputs and address inputs connected to receive said reference address signal for selecting a cadence address and a final amplitude level code of a respective one of said cadence patterns;

a cadence control processing system connected to receive said cadence address for generating status information representing a current signal condition in the course of the respective cadence pattern; and a gain control unit connected to receive the reference address signal, the status information, the final amplitude level code and the current sign bit each corresponding to the same discontinuous tone, said gain control unit adapted for monitoring the status information in regard to a change of the respective cadence pattern, and for generating adjusted amplitude control signals upon initialization by a changing sign bit during a ramp-up and a ramp-down period, said adjusted amplitude control signals including the table select signals and an attenuation control signal representing the shift step number code, wherein any adjustment of the combination of said adjusted amplitude control signal occurs just prior to the respective sine amplitude value becoming zero.

12. The digital tone generator as recited in claim 11, wherein the cadence control processing system comprises:

a microprocessor having an interrupt connected to receive said main synchronizing signal for synchronizing the start of a cadence control cycle of the microprocessor with the operation cycle of the sequencing control means, the microprocessor having an input port and an output port and being determined to monitor in one cadence control cycle the course of each cadence and to generate correspondingly updated status information with respect to each cadence and a cadence cycle signal after updating all cadences;

a cadence read only memory forming a external memory of the microprocessor for storing of time constants and further control information for individually activating frequency components each associated with a respective cadence; and a system random access memory having data inputs connected to receive the status information from the microprocessor output port for buffering and being accessible for a read operation by means of the cadence address for selecting currently stored status information of the respective cadence; and having data outputs connected to said gain control unit.

13. The digital tone generator as recited in claim 12, wherein the system random access memory is composed of two separate system memory banks having address inputs, data inputs connected to receive the status information generated by the microprocessor, data outputs and write enable inputs, and being alternately assigned to the microprocessor for storing current status information with respect to each cadence, on the one hand, and to the cadence select memory and the gain control unit, on the other hand, for reading previously stored status information; and wherein the cadence control processing system further comprises a multiple switch for alternately connecting the address inputs of one system memory bank to the outputs of the cadence select PROM, the data outputs of the same system memory bank to the gain control unit and the address inputs and the write enable input of the other system memory bank to the microprocessor; and a toggle flip-flop having a clock input connected to receive the main synchronizing signal, a data input connected to receive the cadence cycle signal generated by the microprocessor and a control output connected to the multiple switch for passing a switch control signal causing the state of the multiple switch to be reversed into the alternate switch position.

14. The digital tone generator as recited in claim 13, wherein each system memory bank is composed of memory locations each associated with one cadence for storing status information including an individual frequency select flag for each of the frequency components and a cadence enable bit representing the current on and off condition of the cadence; and said frequency select flags indicating by their states the presently active condition of the respective frequency component and the de-activated condition, respectively.

15. The digital tone generator as recited in claim 12, wherein the cadence patterns are divided into consecutive cadence steps each representing a part of the pulse pattern including just one change of a pattern variable at the beginning of a step and correspondingly the cadence read only memory further comprises:
a plurality of memory blocks each associated with a respective one of the cadences and including memory locations for a respective memory word each assigned to one cadence step and accommodating a first group of bit positions for storing a time constant designating the duration of the cadence step in terms of a number of cadence control cycles, accommodating a second bit group representing frequency select bits each designating the state of a respective frequency component during the corresponding cadence step and accommodating a cadence enable bit specifying the currently active condition of the cadence and de-activated condition, respectively.

16. The digital tone generator as recited in claim 15, wherein besides cadence patterns similar dial pulse patterns are provided, and the cadence read only memory further comprises memory locations each for storing a corresponding step of the dial pulse pattern and including a first bit group for storing a further time constant designating the duration of a respective dial pulse step and a secod bit group designated for dial pulse status bits representing information of the dial pulse step.

17. The digital tone generator as recited in claim 16, wherein the cadence read only memory comprises a further bit group in each memory location associated with a cadence step, said further bit group combination representing a code determining a respective one of software flags each associated with a specific cadence, and
wherein selected lines of the microprocessor's output port are fixedly allocated for generating output signals corresponding to one of the cadence software flags and one of the dial pulse status bits, respectively; and
said output signals are adapted to be separately transmitted to a centrally located processing unit of a digital telecommunication system to serve as control signals with duty cycle time constants differing from the respective tone cadence to provide a guard time eliminating access and operation time delays in the centrally located processing unit.

18. The digital tone generator as recited in claim 14, wherein the gain control unit comprises:
a one-out-of-m selector device having m parallel data inputs each connected to receive a respective one of the frequency select flags, selector inputs connected to receive the least significant bits of the reference address signal for selecting, in combination, one data input, and an output carrying the frequency select flag at the selected data input;
a randomly accessible ramp memory for storing the bit combination of the amplitude control signals each associated with a respective frequency component of a digital tone signal for one tone generator operating cycle, said ramp memory having address inputs for receiving the reference address signal, data inputs and data outputs; and
a ramp control memory designed as read only memory and composed of a plurality of memory locations each storing a combination of said amplitude control signals including a bit group representing the shift step number code, a bit rendering the table select signal, a bit representing the current sign bit and an idle channel code bit; said ramp control memory having data outputs and parallel address inputs, including a first group of address inputs connected to respective cadence select memory outputs providing the final amplitude level code, a second group of address inputs connected to the data outputs of the ramp memory, another address input connected to the output of the selector device and a further address input to receive the sign bit associated with the currently present sine wave generator address.

19. The digital tone generator as recited in claim 1, wherein said output means comprises:
a compander including inputs connected to receive the digital encoded signal and outputs and being adapted to modify the signal representation of said digital encoded signal; and
a parallel-to-series converter having parallel inputs connected to said outputs of said compander and a serieal output adapted to be connected to said tone highway.

20. The digital tone generator as recited in claim 19, wherein said output means further comprises a second attenuating unit arranged between said compander and said parallel-to-series converter and accommodating fine adjustment of the amplitude level of the digital encoded signal received from said compander by attenuating the same in one and two db steps, respectively.

21. The digital tone generator as recited in claim 20, wherein said output means being adapted to be connected to two tone highways further comprise a further parallel-to-series converter having parallel inputs arranged in parallel to said inputs of said parallel-to-series converter and a serial output adapted to be connected to said second tone highway; and both parallel-to-series converters including a select enable input for being alternately selectable for receiving consecutive digital tone signals.

* * * * *

UNITED STATES PATENT AND TRADEMARK OFFICE
CERTIFICATE OF CORRECTION

PATENT NO. : 4,399,535
DATED : August 16, 1983
INVENTOR(S) : Gary Southard

It is certified that error appears in the above—identified patent and that said Letters Patent is hereby corrected as shown below:

In Claim 7, at column 43, line 21, please change "n = 2" to --n + 2--.

In Claim 16, at column 45, line 67, please change "secod" to --second--.

In Claim 16, at column 45, line 68, please add --status-- before "information".

Signed and Sealed this

Twenty-seventh Day of December 1983

[SEAL]

Attest:

GERALD J. MOSSINGHOFF

Attesting Officer    Commissioner of Patents and Trademarks